US011498799B2

(12) United States Patent
Kurtz et al.

(10) Patent No.: US 11,498,799 B2
(45) Date of Patent: Nov. 15, 2022

(54) DOFFING APPARATUS AND AUTOMATICALLY GUIDED VEHICLE COMPRISING THE SAME

(71) Applicant: COLUMBIA INSURANCE COMPANY, Omaha, NE (US)

(72) Inventors: Kallin Kurtz, Apison, TN (US); Wes Moore, Rock Spring, GA (US)

(73) Assignee: COLUMBIA INSURANCE COMPANY, Omaha, NE (US)

(*) Notice: Subject to any disclaimer, the term of this patent is extended or adjusted under 35 U.S.C. 154(b) by 26 days.

(21) Appl. No.: 17/085,021

(22) Filed: Oct. 30, 2020

(65) Prior Publication Data

US 2021/0130123 A1    May 6, 2021

Related U.S. Application Data

(60) Provisional application No. 62/929,471, filed on Nov. 1, 2019.

(51) Int. Cl.
*B65H 67/04*    (2006.01)
*G05D 1/00*    (2006.01)
*G05D 1/02*    (2020.01)
*B60P 3/035*    (2006.01)
(Continued)

(52) U.S. Cl.
CPC .......... *B65H 67/0411* (2013.01); *B60P 1/022* (2013.01); *B60P 1/40* (2013.01);
(Continued)

(58) Field of Classification Search
CPC .... B65H 67/0411; B65H 67/04; B65H 67/06; B65H 67/048; B65H 54/26; B65H 54/02; B65H 18/04; B65G 65/02; Y10S 414/124
See application file for complete search history.

(56) References Cited

U.S. PATENT DOCUMENTS 3,974,973 A * 8/1976 Lenk ................. B65H 67/0411
242/473.9
4,340,187 A   7/1982 Schippers et al.
(Continued)

FOREIGN PATENT DOCUMENTS

CN      107444986       12/2017
EP      2952462 A1      7/1998
(Continued)

OTHER PUBLICATIONS

ISA International Search Report dated Jan. 28, 2021 for PCT/US2020/58149.
U.S. Appl. No. 62/899,555, filed Nov. 1, 2019, Kurtz.

*Primary Examiner* — Kaitlin S Joerger
(74) *Attorney, Agent, or Firm* — Ballard Spahr LLP

(57) ABSTRACT

A doffing apparatus can be configured to couple to an automatically guided vehicle (AGV). The doffing apparatus can comprise at least one elongate arm, each elongate arm having a proximal end, a distal end, and a length, and at least one driver, each driver being configured to move along a respective elongate arm to move a bobbin toward the distal end of the elongate arm. The doffing apparatus can further comprise at least one alignment device. The doffing apparatus can further comprise a processor, wherein the processor is configured to: receive feedback from the at least one alignment device, provide a control signal to cause the AGV to align the elongate arm with a receptacle at a loader, and move the driver a select distance along the length of the elongate arm.

18 Claims, 18 Drawing Sheets

(51) Int. Cl.
  *B60P 1/02*  (2006.01)
  *B66F 9/06*  (2006.01)
  *B66F 9/19*  (2006.01)
  *B66F 9/075*  (2006.01)
  *B65G 1/08*  (2006.01)
  *B60P 1/40*  (2006.01)
  *B65G 61/00*  (2006.01)
  *F16H 25/20*  (2006.01)

(52) U.S. Cl.
  CPC ............... *B60P 3/035* (2013.01); *B65G 1/08* (2013.01); *B66F 9/063* (2013.01); *B66F 9/0755* (2013.01); *B66F 9/195* (2013.01); *G05D 1/0088* (2013.01); *G05D 1/0212* (2013.01); *G05D 1/0236* (2013.01); *B65G 61/00* (2013.01); *F16H 25/20* (2013.01)

(56) References Cited

U.S. PATENT DOCUMENTS

| | | | | |
|---|---|---|---|---|
| 4,555,067 | A | * | 11/1985 | Angelucci ............... B65H 54/26 242/473.4 |
| 4,591,106 | A | * | 5/1986 | Gay ........................ B65H 54/26 242/473.6 |
| 4,621,778 | A | | 11/1986 | Paravella et al. |
| 4,775,271 | A | * | 10/1988 | Maccaferri ............ B65H 67/04 242/473.4 |
| 5,096,357 | A | | 3/1992 | Galbani |
| 5,211,346 | A | * | 5/1993 | Brouwer ................. B65H 54/54 242/472.8 |
| 5,531,398 | A | * | 7/1996 | Krska .................... B65H 19/30 242/533.7 |
| 5,593,107 | A | * | 1/1997 | Focke ................... B65G 47/901 242/559.4 |
| 5,779,170 | A | | 7/1998 | Siepmann et al. |
| 6,116,669 | A | * | 9/2000 | Scaglia ............. B65H 67/0411 242/559.1 |
| 2015/0204426 | A1 | | 7/2015 | Wu |
| 2016/0137435 | A1 | * | 5/2016 | Tanaka ..................... B25J 9/023 414/564 |
| 2021/0130123 | A1 | * | 5/2021 | Kurtz ...................... B66F 9/063 |

FOREIGN PATENT DOCUMENTS

WO    WO 2019/092316    5/2019
WO    WO    10/2020
     PCT/US2020/58149

\* cited by examiner

DOFFING APPARATUS AND AUTOMATICALLY GUIDED VEHICLE COMPRISING THE SAME

CROSS-REFERENCE TO RELATED APPLICATIONS

The application claims priority to and the benefit of U.S. Provisional Application No. 62/929,471, filed Nov. 1, 2019, the entirety of which is hereby incorporated by reference herein.

FIELD

The invention relates to an apparatus for automatically transferring material packages, in particular, for use in a manufacturing (e.g., a flooring manufacturing) environment.

BACKGROUND

Filament extrusion systems produce rolls of material wound about a bobbin. After the filament extrusion system has produced a completed material roll (material package), the material package has to be transferred for further processing. Conventionally, transferring the material package from the filament extrusion system requires manually moving the material package. Because a typical material roll can weigh up to 40 pounds and have a diameter of about 400 millimeters, the transfer can be labor-intensive and slow. Accordingly, an improved transfer system is desirable.

SUMMARY

Described herein, in various aspects, is a doffing apparatus that is configured to couple to an automatically guided vehicle (AGV). The doffing apparatus can comprise at least one elongate arm. Each elongate arm of the at least one elongate arm can have a proximal end, a distal end, and a length. At least a portion of each elongate arm of the at least one elongate arm can be configured to support at least one bobbin (or other material package) on the elongate arm. The doffing apparatus can further comprise at least one driver. Each driver can be configured to move along a respective elongate arm. When at least one bobbin (or other material package) is supported on the respective elongate arm, distal movement of the driver along the respective elongate arm can be configured to move the at least one bobbin (or other material package) toward the distal end of the elongate arm.

The doffing apparatus can further comprise at least one alignment device configured to provide an output indicative of a location of one or more elongate arms with respect to one or more target locations.

Each driver can comprise a worm drive comprising a worm wheel and a worm. The worm can extend longitudinally along a corresponding elongate arm. Each driver can comprise a collar that is slidable along the corresponding elongate arm. The collar can be coupled to the worm so that rotation of the worm causes translation of the collar.

The doffing apparatus can further comprise a chassis that is configured to be secured to an upper surface of the AGV.

The at least one elongate arm can comprise first and second elongate arms positioned on opposing sides of the chassis. The at least one driver can comprise first and second drivers, wherein the first driver is configured to move along the first elongate arm, and wherein the second driver is configured to move along the second elongate arm.

A doffing system can comprise an AGV and a doffing apparatus. At least one alignment device can be configured to provide an output indicative of a location of one or more elongate arms with respect to one or more target locations. A doffing system can comprise at least one processor. The at least one processor can be configured to: receive feedback from the at least one alignment device, provide a control signal to cause the AGV to align a first elongate arm of the at least one elongate arm with a receptacle at a loader, and cause a first driver of the at least one driver to move a select distance along the length of the first elongate arm.

The at least one processor can be physically associated with the AGV.

The at least one processor can be physically associated with the doffing apparatus.

The at least one alignment device can comprise a laser range detector. The laser range detector can be configured to emit a laser beam toward a surface of the one or more target locations, receive a reflection of the laser beam from the surface of the one or more target locations, and determine a distance from the laser range detector to the surface of the one or more target locations based on the received reflection of the laser beam.

The one or more target locations can comprise a body defining a cylindrical recess.

The at least one alignment device can comprise a camera that is configured to capture an image having a reference surface therein. The processor can be further configured to: receive the image, and determine, based on the image, a position of the doffing apparatus relative to the reference surface.

A system comprising a doffing system and at least one winder, each winder of the at least one winder having a chuck. A computing device can comprise at least one second processor and a memory in communication with the at least one second processor. The memory can have instructions thereon that, when executed by the at least one second processor of the computing device, cause the at least one second processor of the computing device to: cause the AGV to align one elongate arm of the at least one elongate arm of the doffing apparatus with the chuck of the at least one winder; and cause the chuck to doff a material package onto to the one elongate arm of the doffing apparatus.

The system can further comprise a loader having a robotic arm with an end effector. The memory can have instructions that, when executed by the at least one second processor, cause the at least one second processor to: cause the AGV to move toward the loader, cause the AGV to align the doffing apparatus with the end effector of the robotic arm, and cause the driver to doff the material package to the end effector of the robotic arm.

The system can further comprise a tube magazine station, the tube magazine station comprising: a hopper having at least one compartment, wherein the hopper defines a respective inlet opening and a respective outlet in communication with each compartment of the at least one compartment, wherein each inlet opening is configured to receive at least one empty bobbin (or other empty material package), wherein each outlet is sized to allow one respective empty bobbin at a time to pass therethrough, wherein each compartment of the at least one compartment has a lower surface with a slope that is configured to bias the at least one empty bobbin toward the outlet in communication with the compartment; and at least one lip, wherein the at least one lip is configured to retain the respective one empty bobbin as the respective one empty bobbin exits each outlet.

The at least one compartment can comprise a plurality of compartments. The at least one outlet can comprise a plurality of outlets. The at least one lip can comprise a plurality of lips. A respective lip can be associated with each outlet and is configured to retain the respective empty bobbin in axial alignment with each other empty bobbin retained by the respective lip associated with each other outlet.

The memory can have instructions that, when executed by the at least one second processor, cause the at least one second processor to: cause the AGV to align one elongate arm of the at least one elongate arm of the doffing apparatus with each empty bobbin retained by the at least one lip of the tube magazine station; and cause the AGV to move to receive each empty bobbin retained at each outlet of the plurality of compartments on the one elongate arm.

The memory can have instructions that, when executed by the at least one second processor, cause the at least one second processor to: cause the AGV to move to a winder of the at least one winder; cause the AGV to align the one elongate arm of the at least one elongate arm of the doffing apparatus with the chuck of the winder; and cause the doffing apparatus to doff each empty bobbin received on the one elongate arm onto the chuck of the winder.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
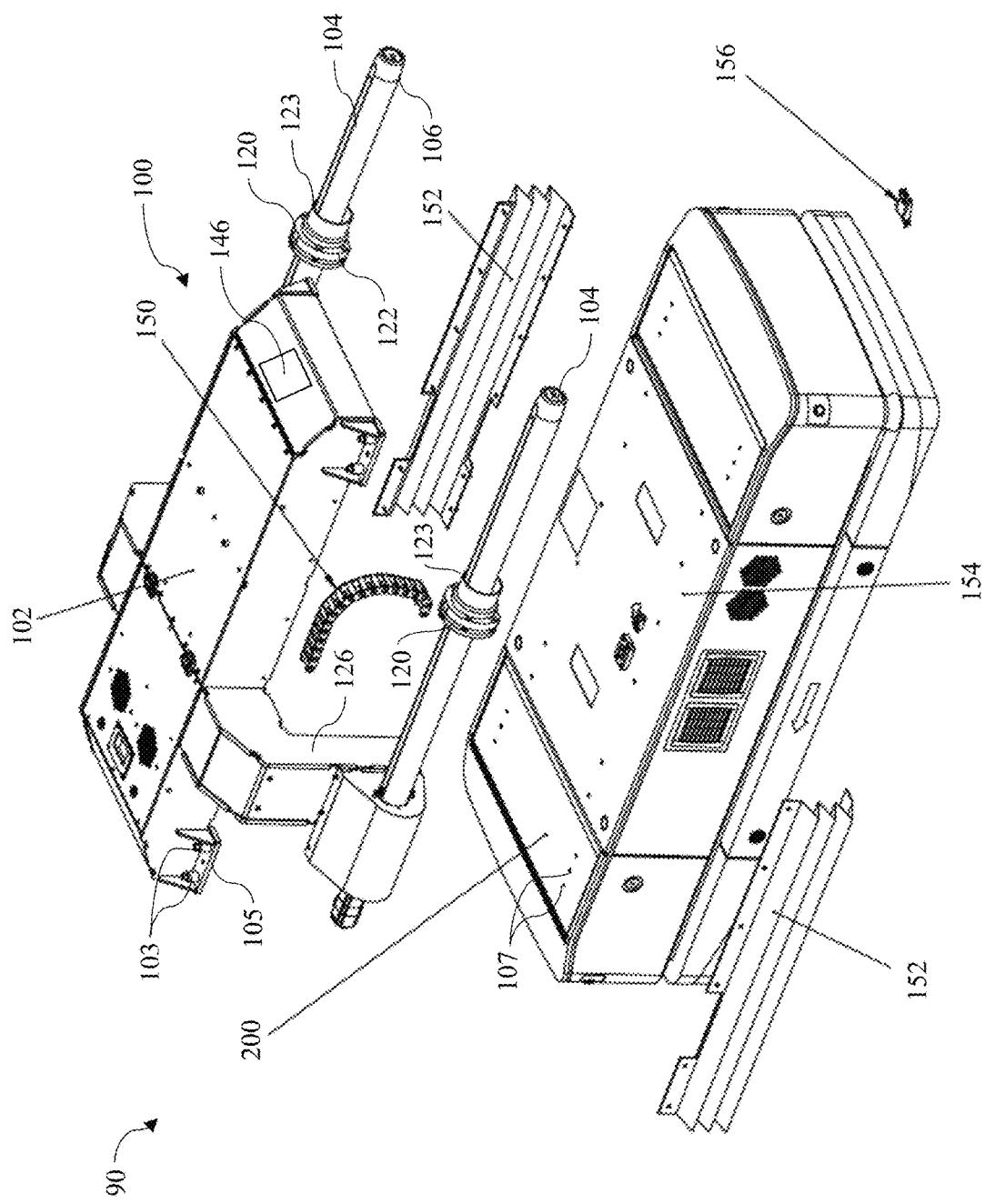
FIG. 1 is an exploded view of a doffing system comprising a doffing apparatus and an automatically guided vehicle (AGV), in accordance with embodiments disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "an elongate arm" can refer to one or more of such elongate arms, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values or characteristics are approximated by use of the antecedents "about," "substantially," or "generally," it is contemplated that values within up to 15%, up to 10%, up to 5%, or up to 1% (above or below) of the particularly stated value can be included within the scope of those aspects. Similarly, use of "substantially" (e.g., "substantially parallel") or "generally" (e.g., "generally planar") to refer to the orientation of a surface should be understood to include embodiments in which angles are within about ten degrees, or within five degrees, or within one degree.

The word "or" as used herein means any one member of a particular list and also includes any combination of members of that list.

As used herein, except where otherwise indicated, it is understood that embodiments described or claimed using "comprise," "comprises," or "comprising" can be alternatively be described or claimed using "consisting essentially of" or "consisting of" or equivalent terms.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Figure 2:
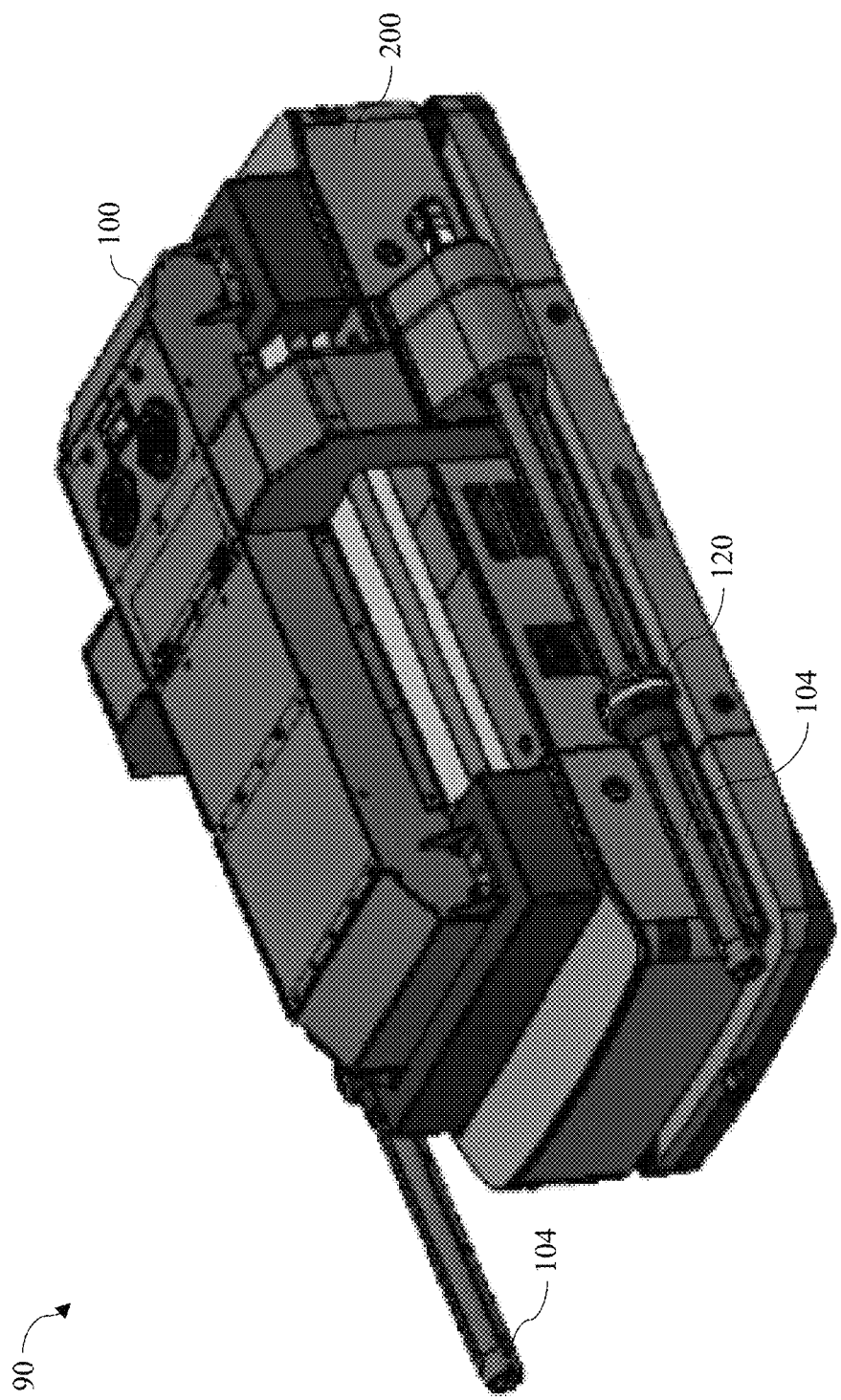
FIG. 2 is a perspective view of the doffing system of FIG. 1.
Figure 3:
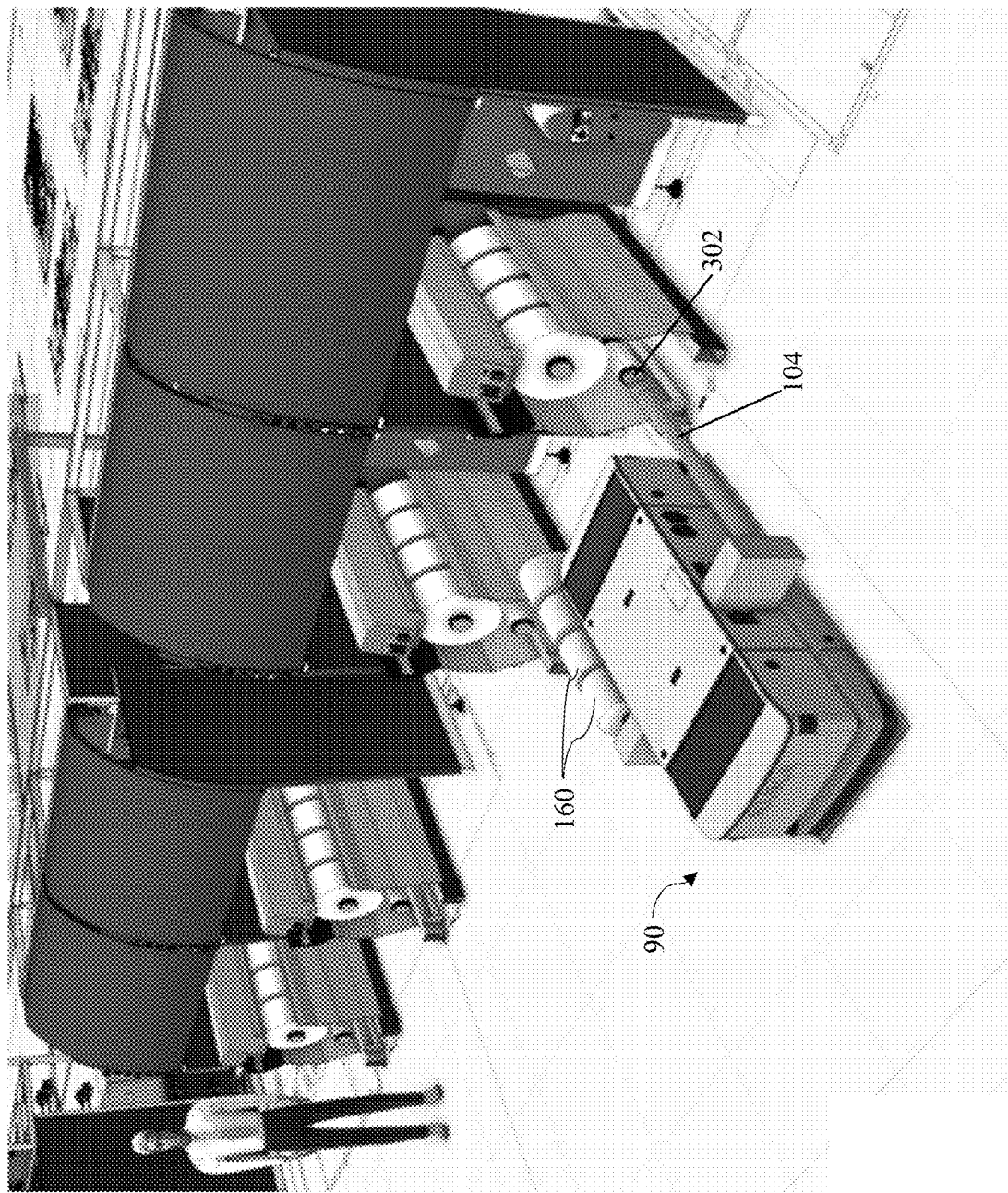
FIG. 3 is a perspective view of the doffing system of FIG. 1 that is interfacing with a filament extrusion system (e.g., a winder) in an operating environment.

Disclosed herein, in various aspects and with reference to FIGS. 1-2, is a material doffing system 90 comprising a doffing apparatus 100 attached to an automatically guided vehicle (AGV) 200. The AGV 200 can optionally be an AGV manufactured by KUKA ROBOTICS. The doffing apparatus 100 can comprise a chassis 102 that is configured to couple to a top side of the AGV 200. For example, the chassis 102 can attach to the AGV 200 via screws 103 through attachment flanges 105 in the chassis 102 and into threaded holes 107 in the top of the AGV 200. The chassis 102 can support one or more elongate arms 104 (e.g., a pair of elongate arms 104) in a cantilevered configuration. Optionally, the chassis 102 can define at least one lateral projection (e.g., a laterally extending arm) or housing that defines a bore for receiving a portion of a corresponding elongate arm 104. Optionally, as shown in FIG. 1, the chassis 102 can define two opposing lateral projections that define bores for receiving portions of two elongate arms 104. The elongate arms 104 can optionally have cylindrical or generally cylindrical profiles with a tapered distal end 106. Optionally, it is contemplated that the diameter of the elongate arms can be approximately the same diameter as a winder chuck, as further described herein, in order to facilitate smooth transfer of bobbins and material packages between the chuck winder and the elongate arms when the chuck winder and the elongate arms are coaxially aligned.

Figure 6:
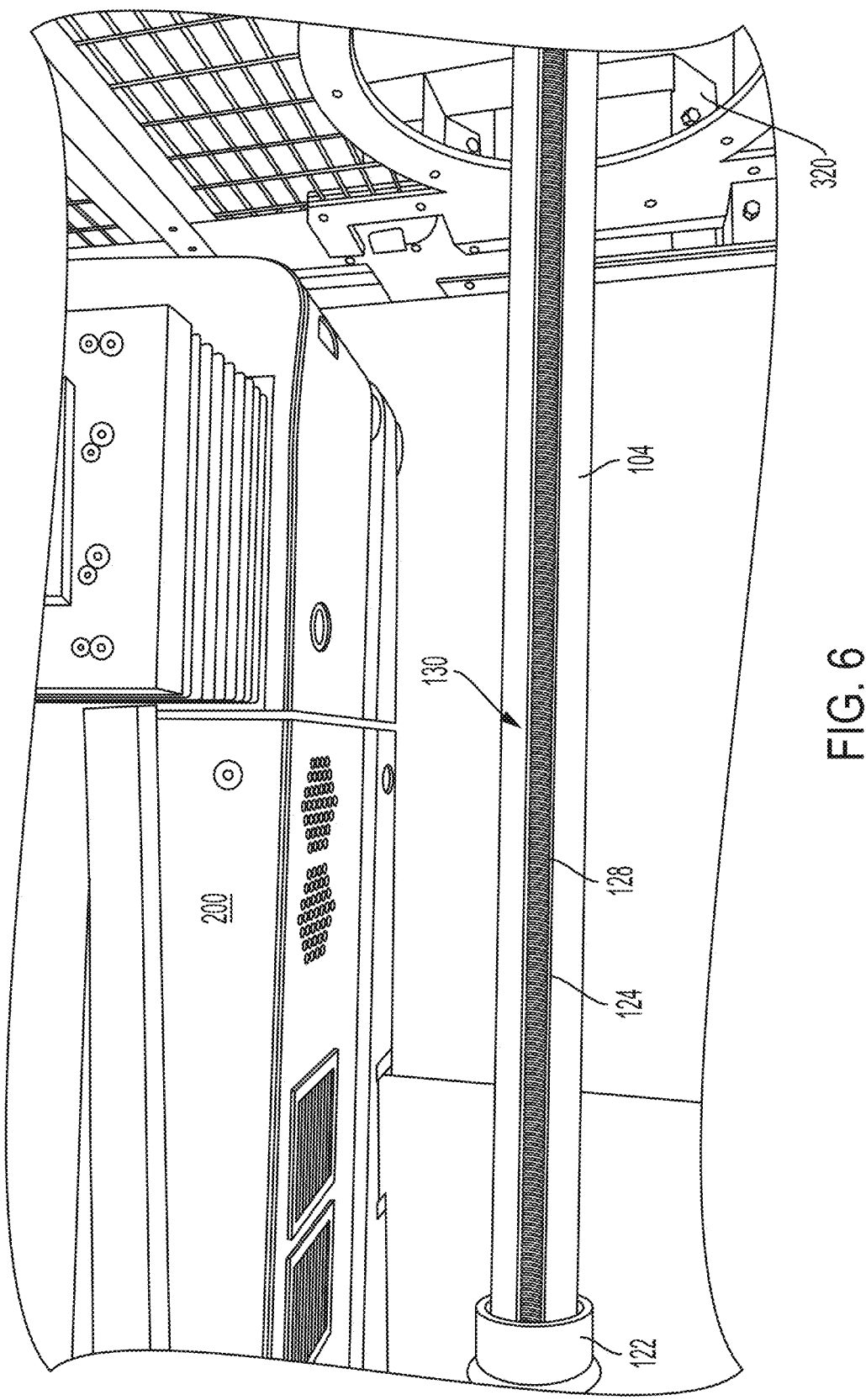
FIG. 6 is a top view of an elongate arm of the doffing apparatus as in FIG. 1.

As shown in FIGS. 1-2 and 6, the doffing apparatus can include a driver 120 that is configured to push material packages 160 distally (toward the outer end of the arm) along the respective elongate arm. In exemplary aspects, the material packages 160 can be bobbins or tubes. (The terms "bobbin" and "tube" are used interchangeably herein to describe rolls about which material is, or can be, wound.) The bobbin can define a cylindrical through-hole through which the elongate arm can extend with sufficient clearance to slide smoothly along the elongate arm. The driver 120 can comprise a collar 122 that slidably engages the respective elongate arm and can be movable along the length of each elongate arm in order to engage material packages 160 (e.g., bobbins or tubes). A worm drive 124, comprising a motor 126, a worm gear (not shown), and a worm 128, can engage the collar 122 to move the collar 122 proximally and distally along the respective elongate arm 104. The elongate arm 104 can define an outer circumference and a longitudinal channel 130 within the outer circumference. The worm 128 can be positioned in the longitudinal channel 130, within the outer circumference of the elongate arm 104. Optionally, the collar 122 can define teeth that extend into the channel 130 to engage the worm 128. The collar 122 can have a distal end 123 having a maximum diameter that is less that the diameter of the empty bobbin so that the collar engages only the bobbin and not material wound around the bobbin.

The motor 126 can be a servo motor. The doffing apparatus 100 or doffing system 90 (with a processor as further disclosed herein) can determine, based on the number of rotations of the motor 126 (and a known gear ratio), the travel of the collar 122 along the respective elongate arm and, accordingly, the position of the collar on the respective elongate arm. Thus, the doffing apparatus 100 or doffing system 90 can determine the number of material packages (or empty tubes/bobbins 162) that have been pushed from the elongate arm.

Figure 7:
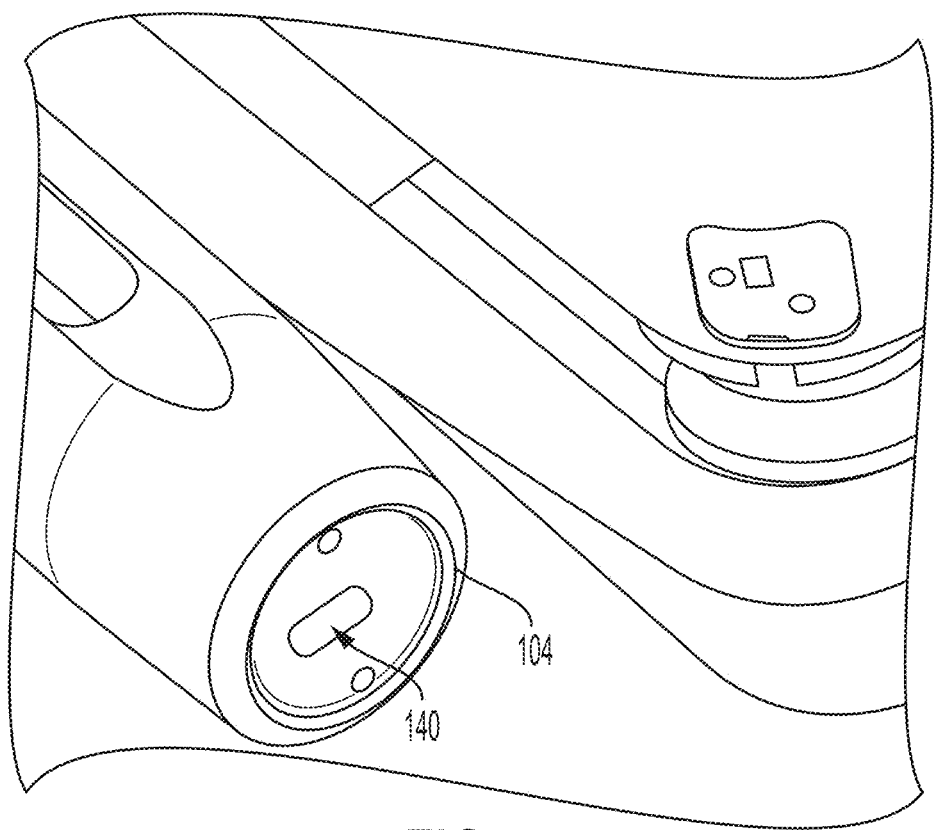
FIG. 7 is a partial perspective view of the doffing apparatus as in FIG. 1, detailing an alignment device.
Figure 8:
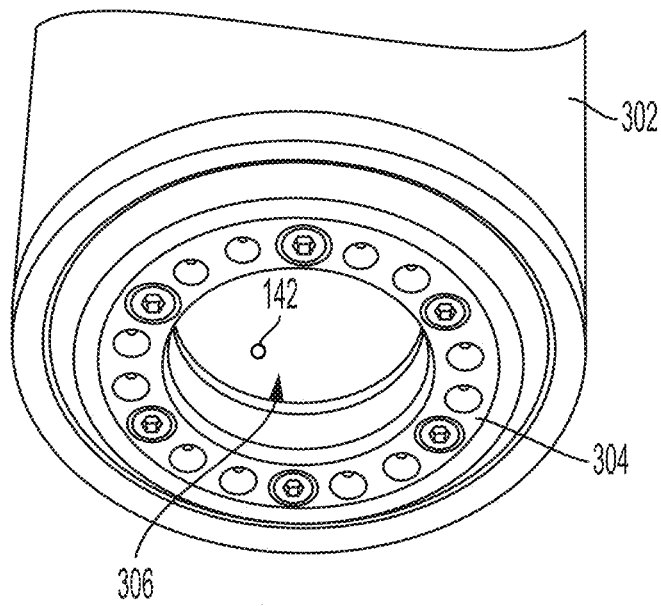
FIG. 8 is a partial perspective view of a chuck of the filament extrusion system of FIG. 3.
Figure 9:
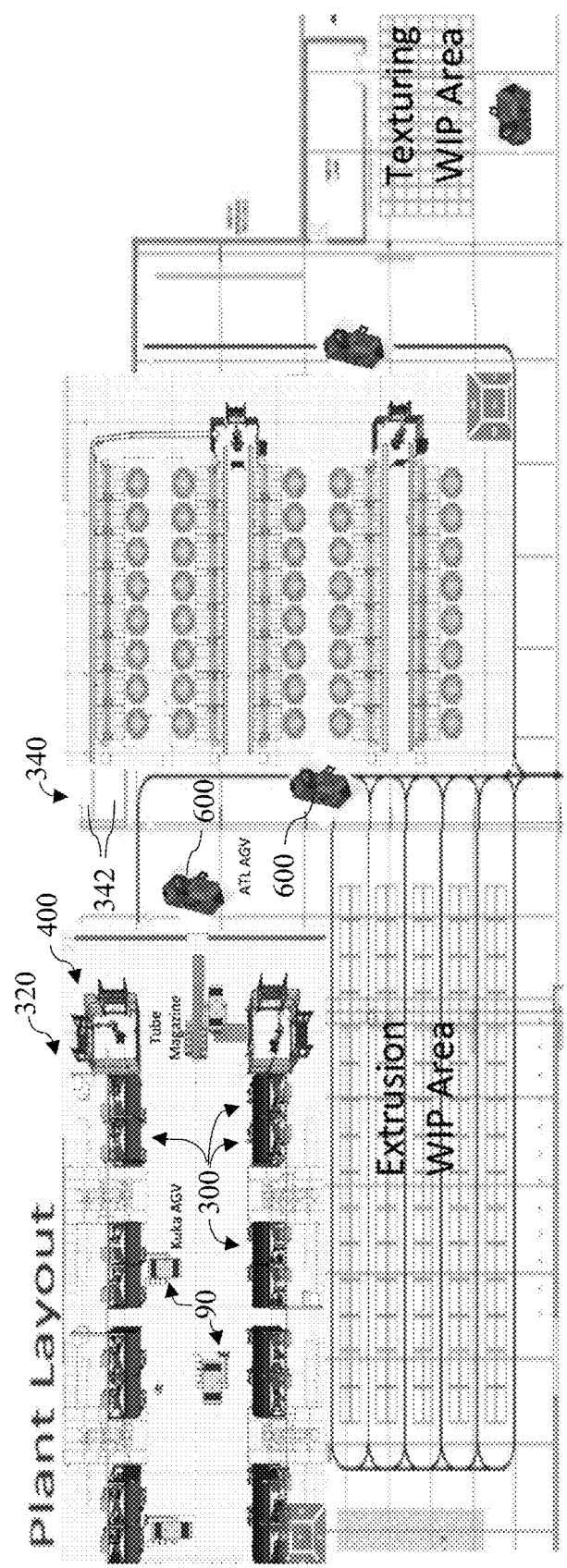
FIG. 9 is a top (bird's eye) view of an exemplary operating environment.
Figure 10:
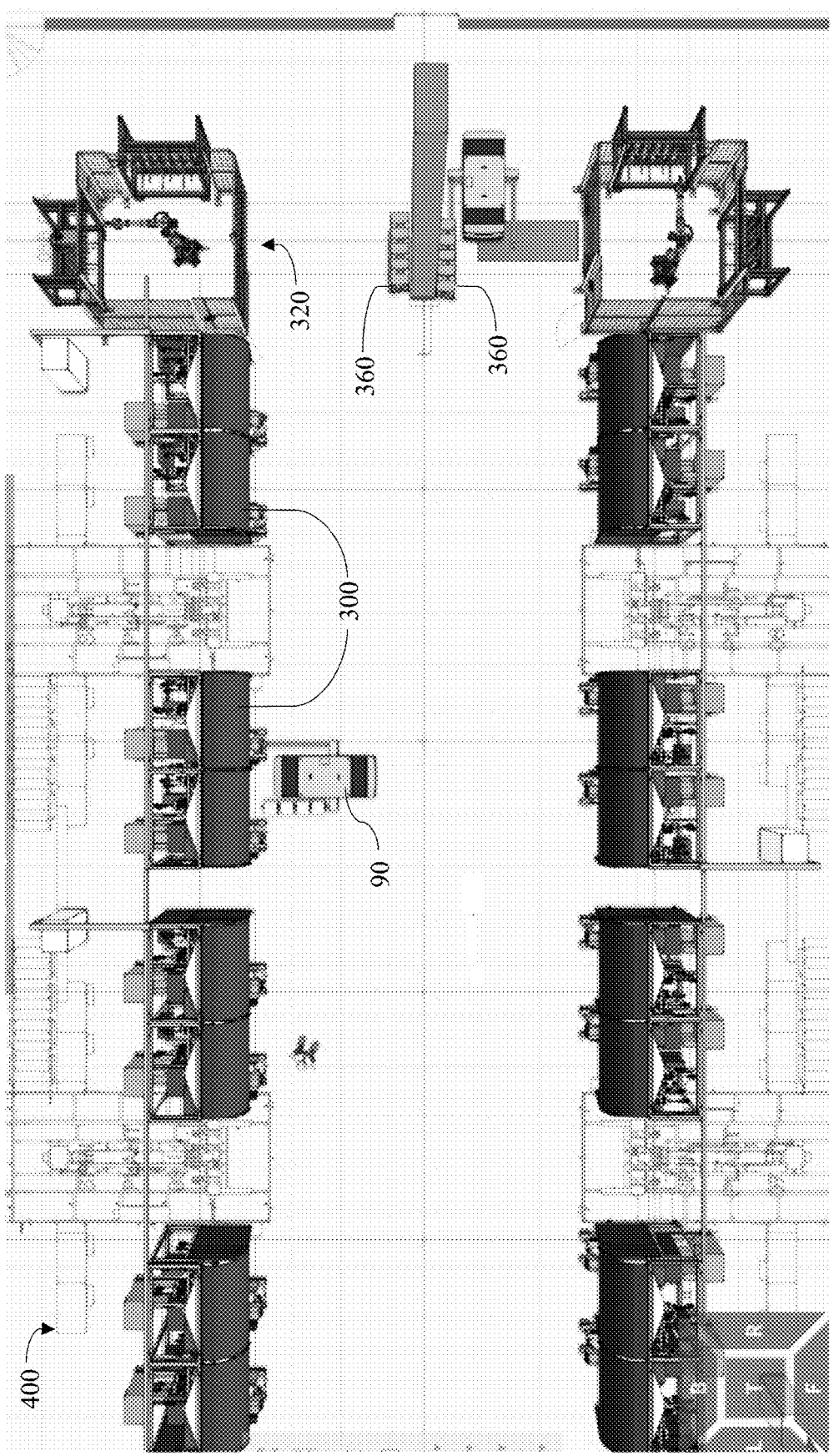
FIG. 10 is a close-up detail view of a portion of bird's eye view of the operating environment as in FIG. 9.
Figure 11:
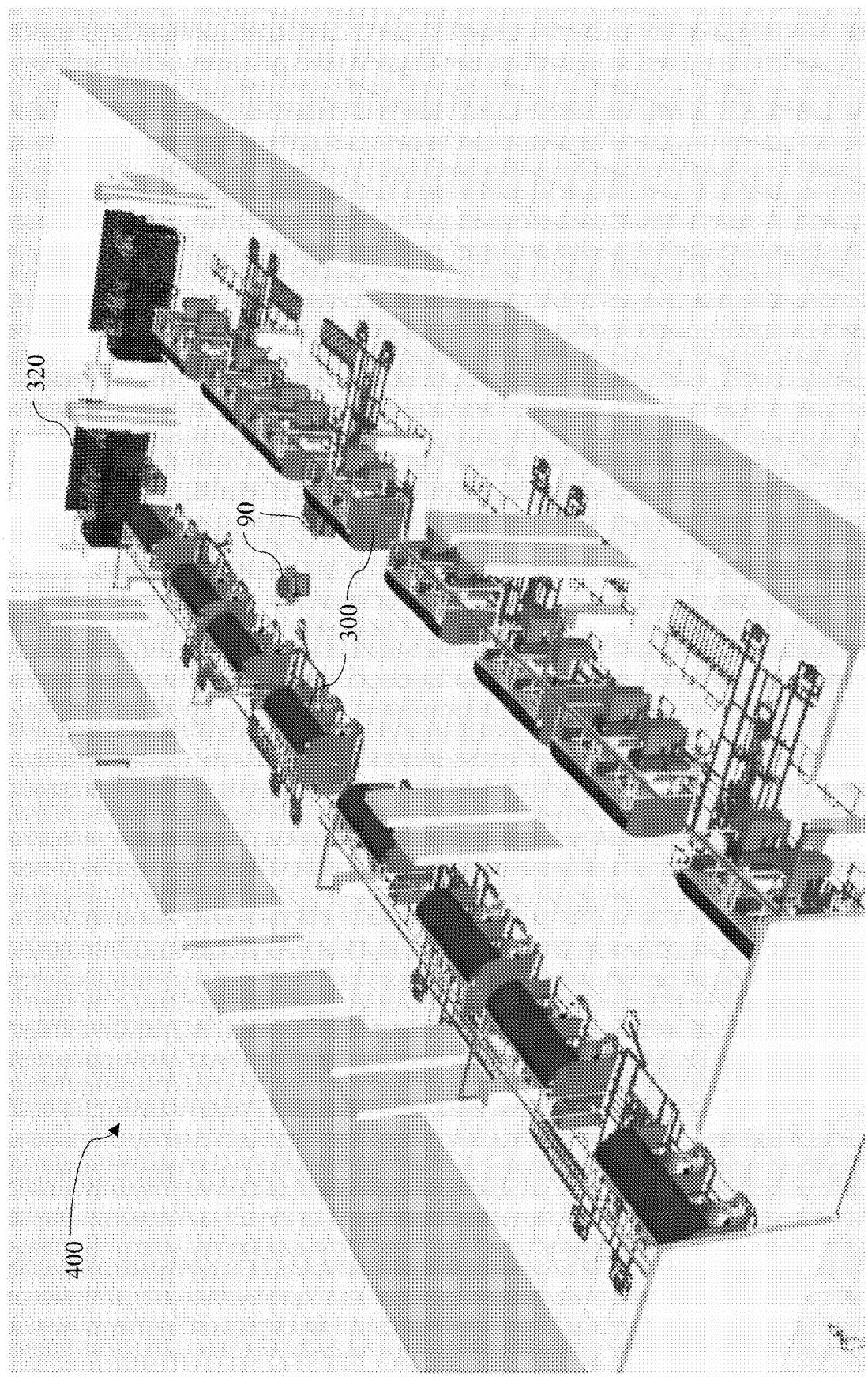
FIG. 11 is a perspective view of the operating environment as in FIG. 9.
Figure 12:
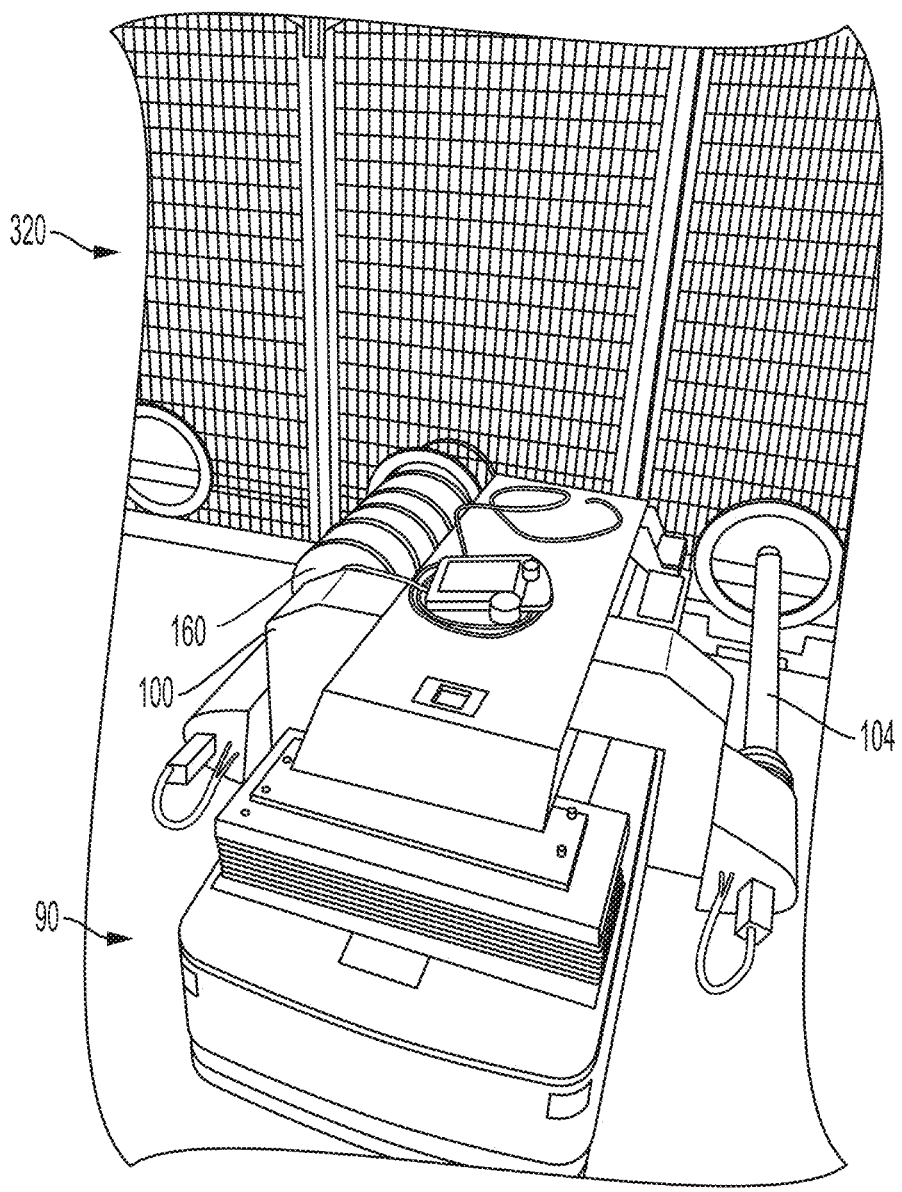
FIG. 12 is a perspective view of the doffing system of FIG. 1 that is interfacing with the loader.

Referring to FIGS. 1, 7, and 8, the doffing apparatus 100 can comprise an alignment device. The alignment device can comprise a laser scanner 140 disposed at the distal end of each elongate rod. The laser scanner can be configured to detect a location of a winder chuck 302 (also commonly referred to as a spindle) of a filament extrusion system (or winder 300). The laser scanner can be configured to emit a beam 142. In some embodiments, the laser scanner can emit a point beam to detect if the elongate arm 104 is aligned with the winder chuck 302. The laser scanner can further comprise a detector that is configured to receive a reflection of the laser beam from a reflecting surface. In exemplary aspects, the laser scanner 140 can be a laser range detector as is known in the art. In some aspects, the laser scanner can be configured to measure a distance between the laser scanner and a target (e.g., the chuck 302). The scanner can be used to detect a profile or marker on the chuck, such as, for example, a cylindrical recess 306 in a distal end 304 of the chuck 302, wherein the cylindrical recess 306 is coaxial with the chuck 302. For example, as the laser is moved across the surface of the distal end 304 of the chuck 302, step changes in distance measured by the laser scanner can correspond to the edges of the cylindrical recess 306. In this way, the doffing apparatus can provide feedback to the AGV 200 to enable the AGV to align one elongate arm of the doffing apparatus with the chuck for material transfer. A similar cylindrical recess can be provided on an end effector/gripper 324 of a robotic arm 322 in a loader 320 so that the AGV can detect and align its elongate rods 104 with the gripper 324. Thus, in use, the AGV can be configured to detect and align the elongate rods 104 with cylindrical recesses in either the chuck 302 of the winder 300 or the end effector/gripper 324 of the loader 320.

Figures 15A, 15B:
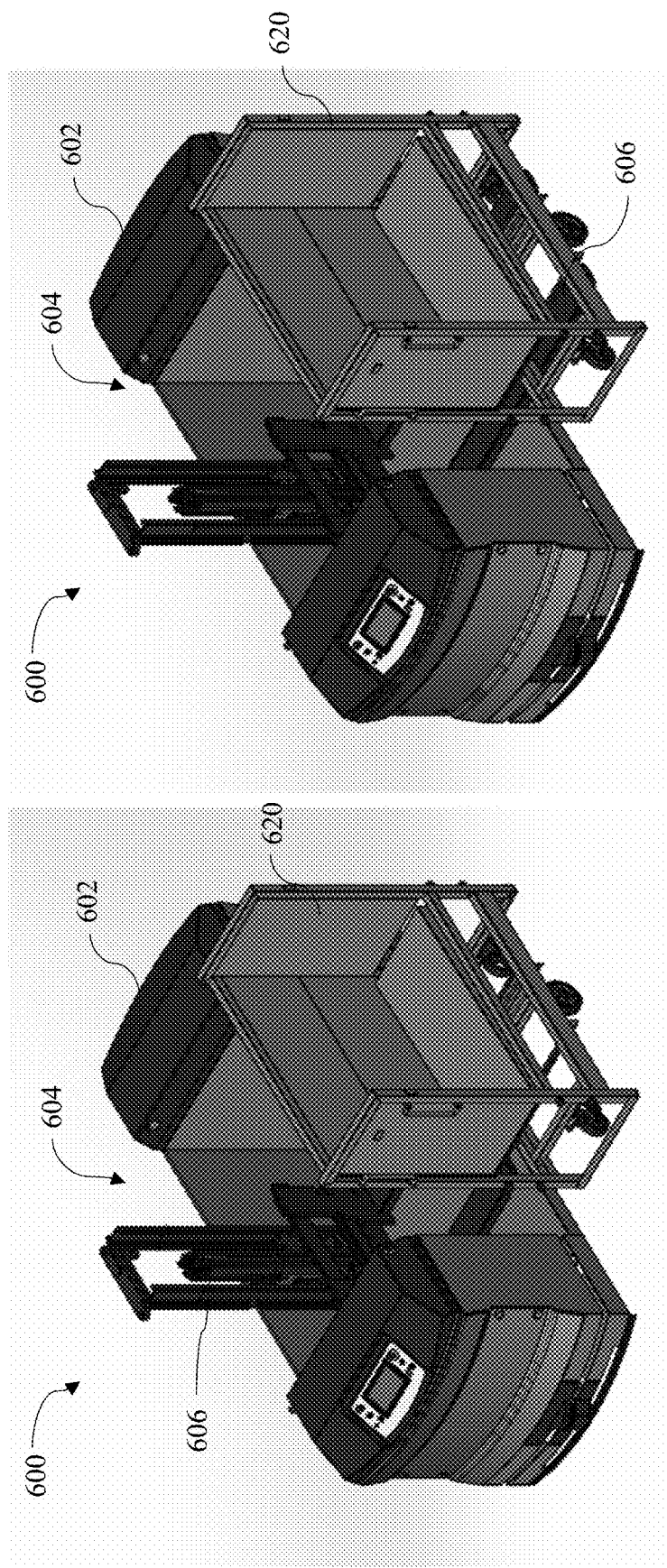
FIG. 15A is a perspective view of a cart transport positioned adjacent a cart.
FIG. 15B is a perspective view of a lift the cart transport extending outwardly from the cart transport and beneath the cart for lifting the cart.
Figure 15C:
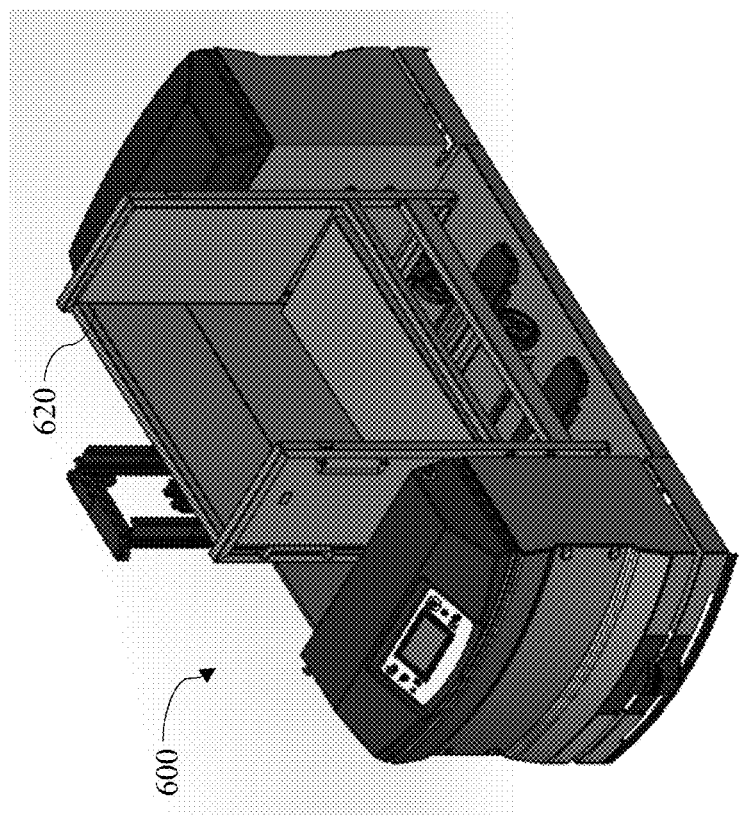
FIG. 15C is a perspective view of the cart positioned with a cargo area of the cart transport.
Figure 16:
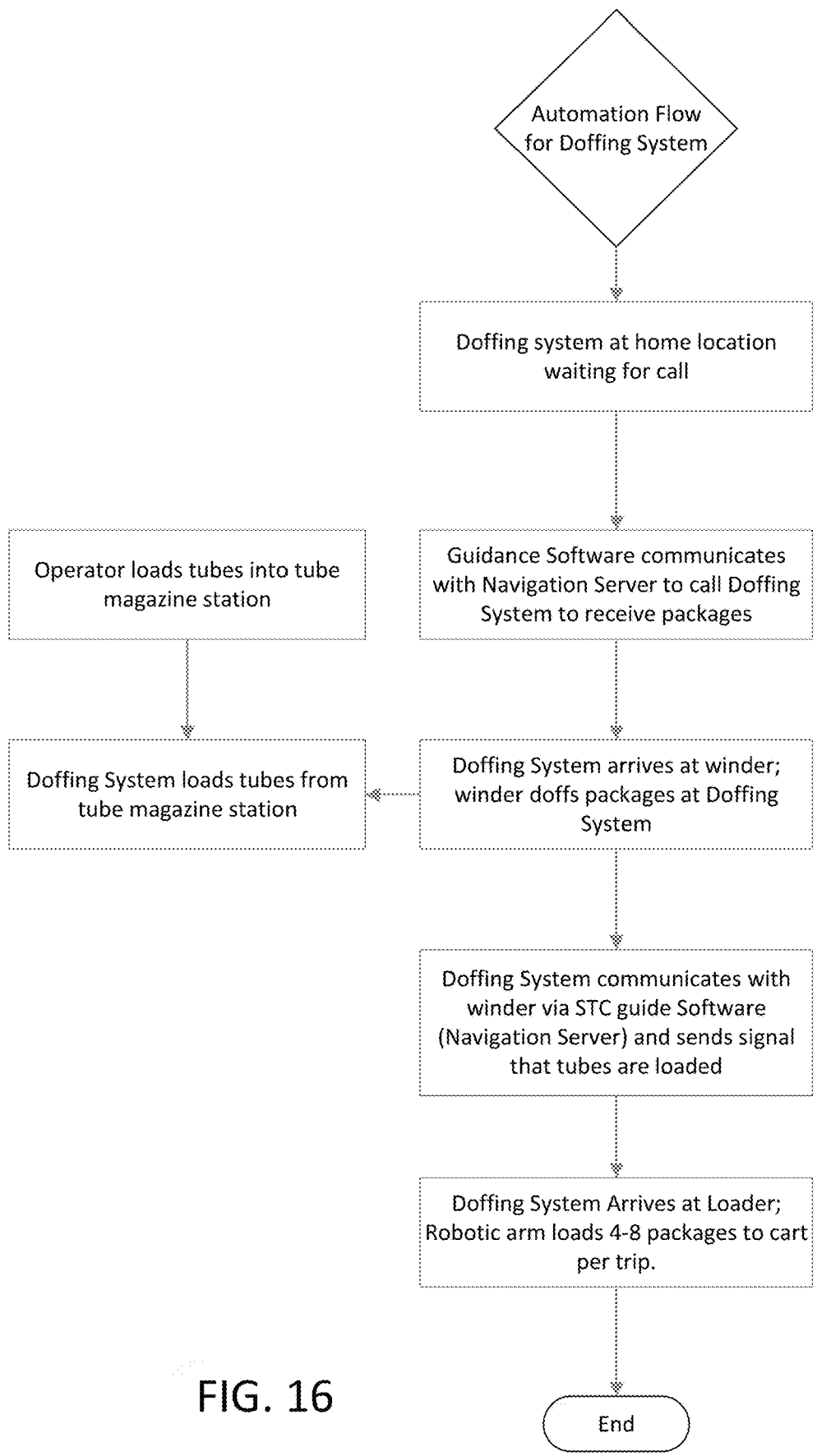
FIG. 16 is a flow chart showing a method, in accordance with embodiments disclosed herein.

The loader 320 can be configured to receive material packages from the doffing apparatus 100 and deliver the material packages to a cart 620 (optionally, a cart that is positioned on casters, as in FIGS. 15A-15C, or other suitable rack or frame for holding material packages for storage and transport). A cart transport 600 (e.g., an AGV having a payload receptacle thereon) can then be used to transport the cart 620 with the material packages thereon for further processing, as well as return empty carts 620 for re-loading.

The AGV 200 can have a riser (including an associated actuator for effecting movement relative to a vertical axis) that can raise and lower the doffing apparatus 100. This can be beneficial for positioning the doffing apparatus for receiving and delivering material packages. Additionally, the riser can enable the AGV to avoid collisions between the elongate arms and obstacles. The AGV 200 can further comprise a LiDAR system that is configured to detect objects in the vicinity of the AGV, and the AGV can use data from the LiDAR system to control its movement and avoid obstacles. The riser and LiDAR features of the AGV are well known in the art and are not described in detail here. However, the usage of these features in combination with the disclosed doffing apparatus provides significant advantages in the context of doffing and other filament extrusion processing steps as disclosed herein. In further aspects, the doffing system 90 can comprise at least one camera 146 that can be used for navigation, positioning and alignment of the doffing system, obstacle avoidance, or any combination thereof. Additionally, or alternatively, a safety non-contact proximity assembly 156 can attach to the front of the AGV 200 and can assist the doffing system 90 in avoiding obstacles. It is contemplated that the safety non-contact proximity assembly 156 can comprise one or more proximity sensors as are known in the art, with the proximity sensors being communicatively coupled to processing components of the system as disclosed herein.

The doffing system 90 can further comprise a cable carrier assembly 150 that houses cables that communicatively couple a programmable logic controller (PLC) 92 (FIG. 13) of the doffing apparatus 100 with the alignment device (e.g., the laser detector 140) and AGV 200. The cable carrier assembly 150 can further enable the AGV 200 to raise and lower the doffing assembly 100 via the riser. A pair of side bellows 152 can attach at respective sides of the doffing assembly 100 to inhibit dust and other objects from getting between the doffing apparatus 100 and the AGV 200. A top cover assembly 154 can provide an interface between the AGV 200 and the doffing assembly 100.

Figure 13:
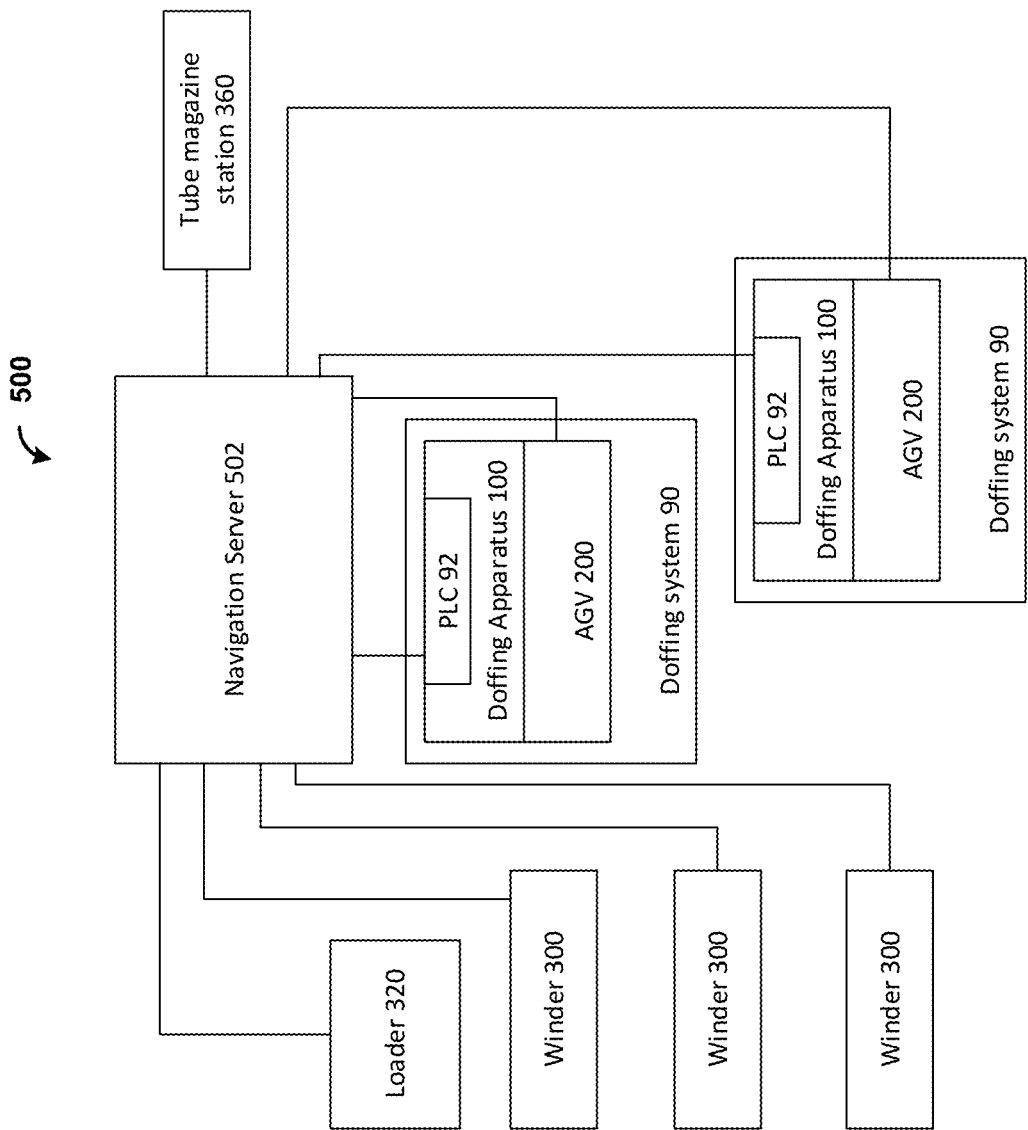
FIG. 13 is a schematic of a navigation system for controlling operation of the doffing systems and operating environment.
Figure 14:
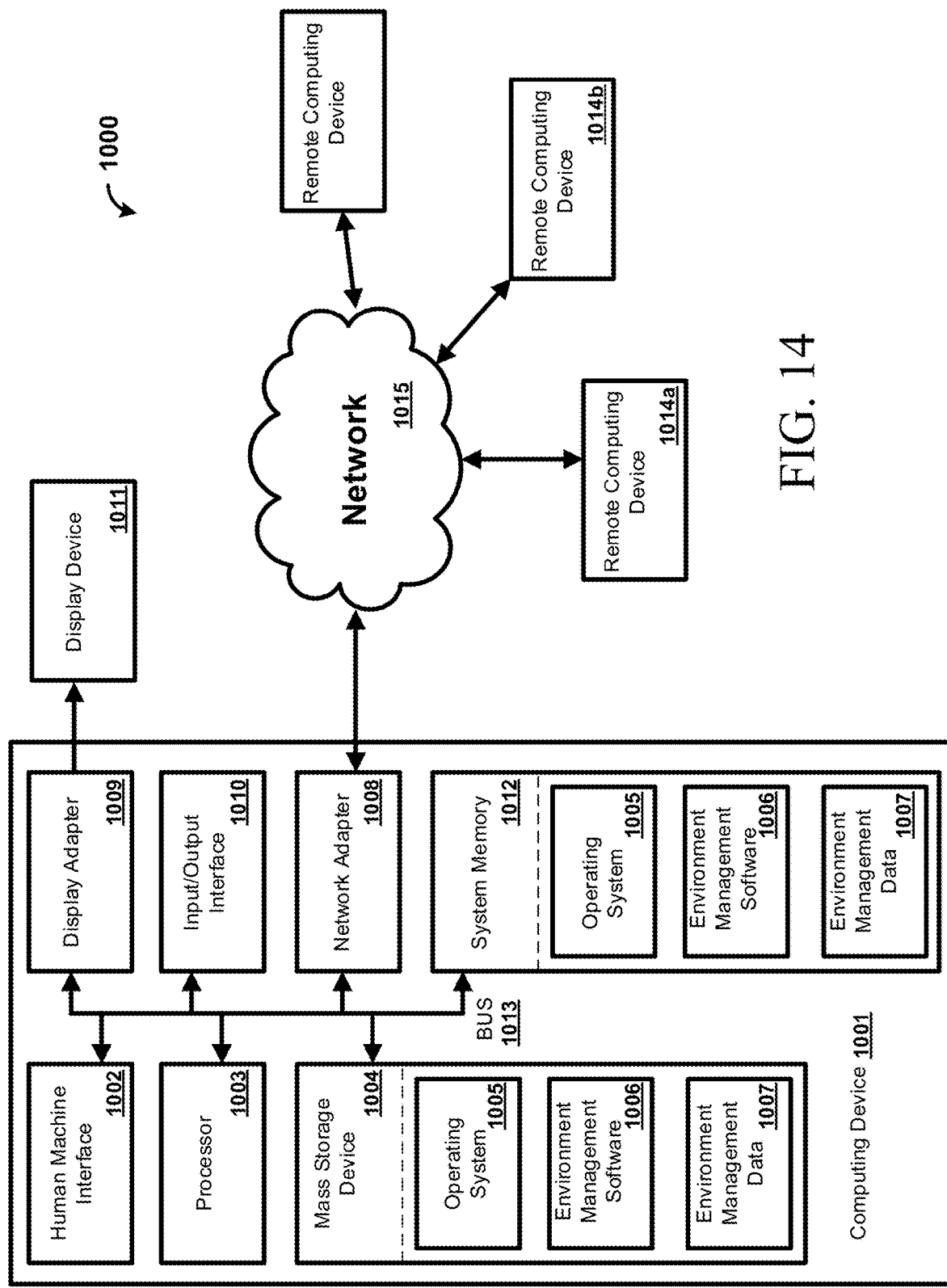
FIG. 14 is a computing device, in accordance with embodiments disclosed herein.

Referring to FIGS. 13 and 14, the PLC 92 of the doffing apparatus can have the configuration as disclosed with respect to the remote computing device 1014a, further described herein. Although depicted as a PLC, it is contemplated that the doffing apparatus can include any computing device as further disclosed herein. In further embodiments, although depicted as being associated with or positioned within the doffing apparatus, it is contemplated that the PLC 92 can instead be associated with or positioned within the AGV 200. In still further embodiments, each of the doffing apparatus and the AGV 200 can have respective PLCs that can optionally be in communication with each other (e.g., via cables in the cable carrier assembly 150). The PLC 92 can be configured to control various aspects of the doffing apparatus 100, including, for example, the laser detector 140 and the driver 120. For example, the PLC 92 can be configured to receive feedback from the alignment device to determine if an elongate arm 104 of the doffing apparatus is aligned with a target (e.g., a cylindrical recess in a winder or an end effector of a loader). Based on the feedback from the alignment device, the PLC 92 can be configured to provide a control signal to cause the AGV to move (e.g., move horizontally or adjust the height of the riser) to align the elongate arm 104 with the target. The PLC 92 can further be configured to cause the driver 120 of the respective elongate arm to move the collar 122 a select distance along the length of the elongate arm to unload a tube or material package (e.g., onto the winder or loader).

In some optional embodiments, the material packages (e.g., bobbins or tubes) can be restricted to select size and weight maximums in order to allow the AGV to stay balanced, as well as prevent the material packages from interfering with the area scanners (e.g., LiDAR). For example, in some embodiments, the maximum material package dimensions can be 400 mm in diameter, 40 pounds in weight, and 290 mm in length. Accordingly, the doffing apparatus can be structurally sufficient to support each elongate arm when the elongate arm is holding a plurality of material packages (e.g., four material packages weighing 40 pounds each). Likewise, the elongate arm can have sufficient length to hold the plurality of material packages (e.g., four material packages). Thus, in some embodiments, to ensure that the plurality of material packages can be accommodated, the arms can extend an adequate distance (e.g., at least 1.2 meters) from the structure that supports them in a cantilevered fashion.

Figure 4:
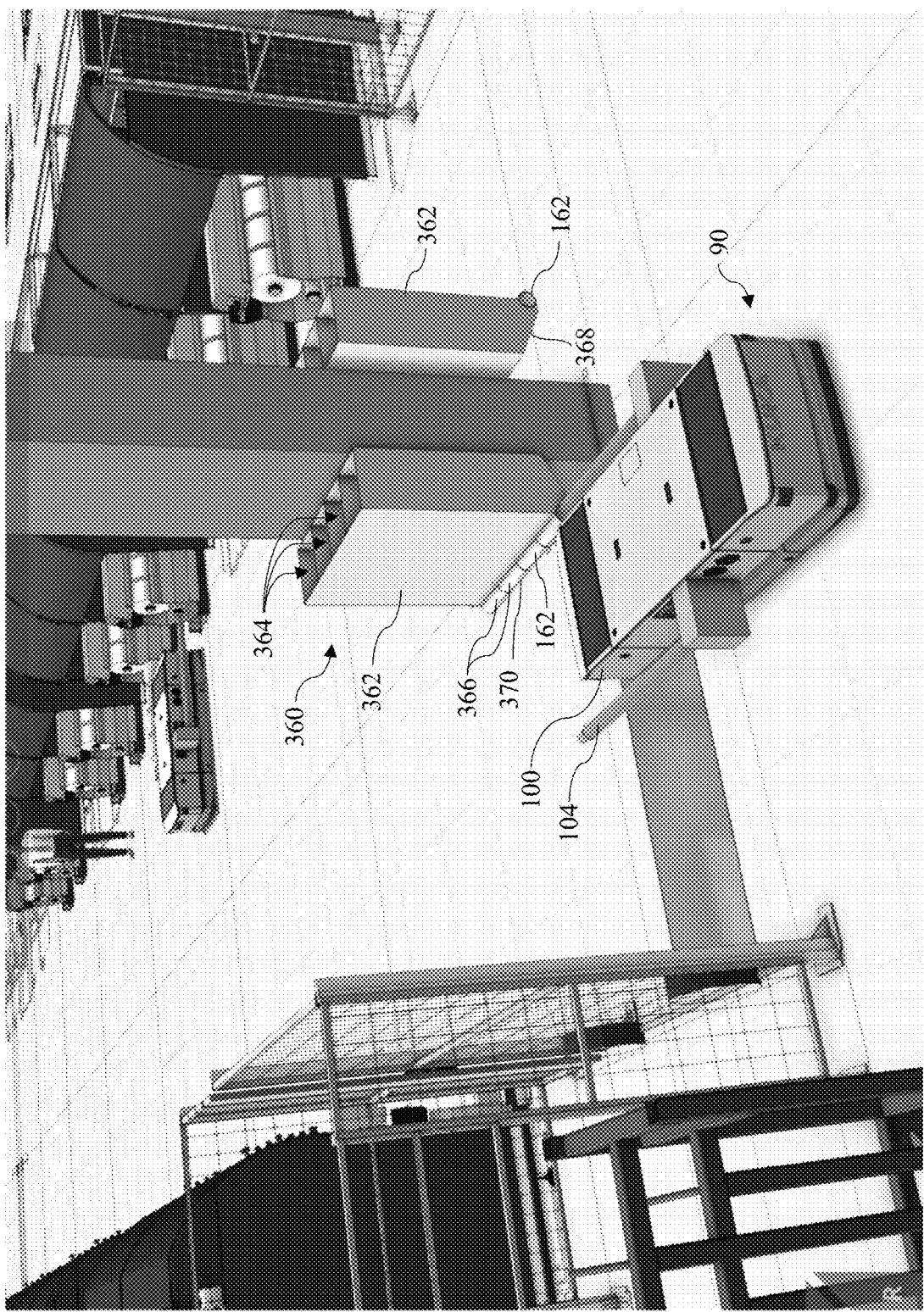
FIG. 4 is a perspective view of the doffing system of FIG. 1 in the operating environment, further illustrating a tube magazine station.
Figure 5:
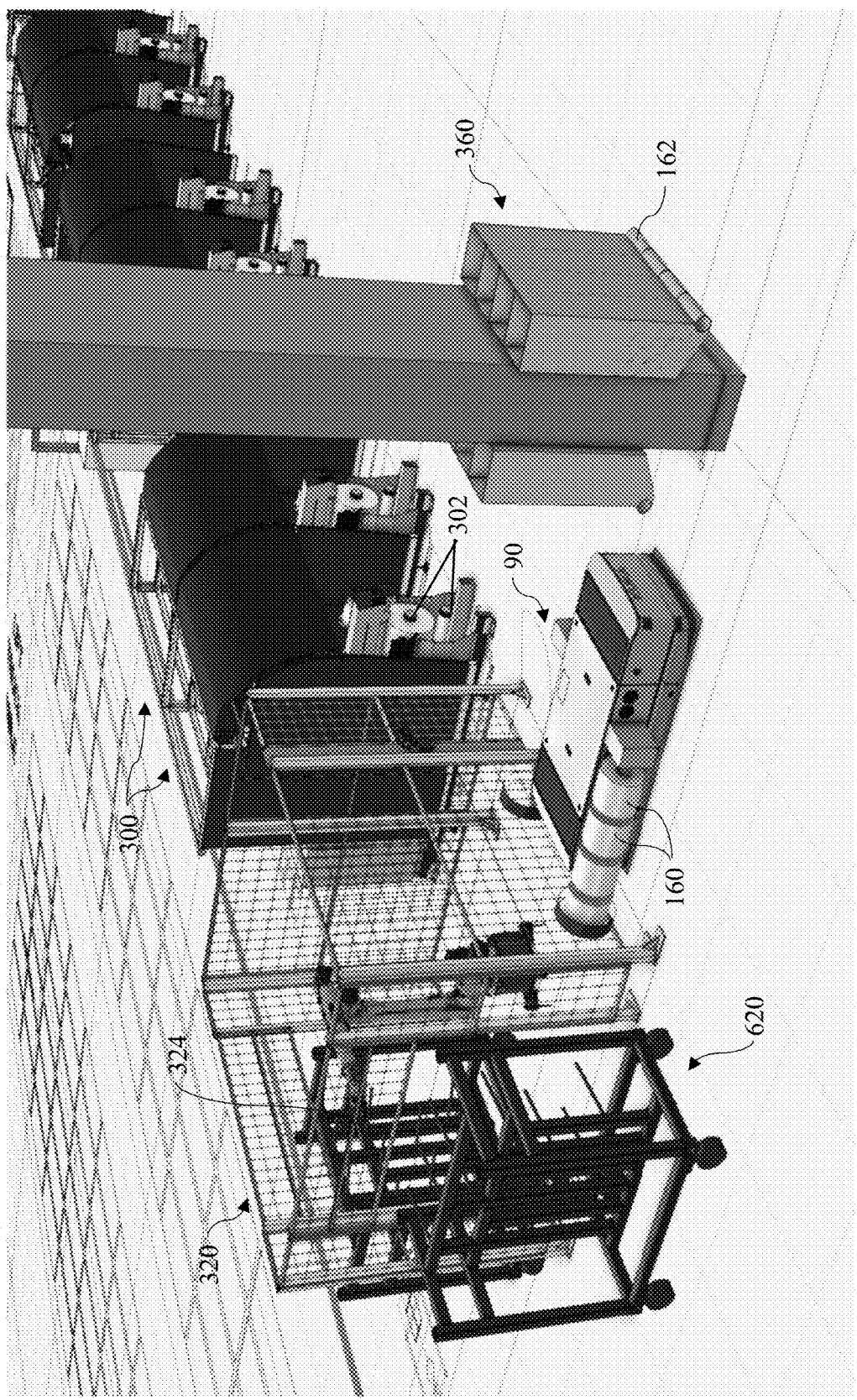
FIG. 5 is a perspective view of the doffing system of FIG. 1 in the operating environment, wherein the doffing system is interfacing with a loader having a robotic arm.
Figure 19:
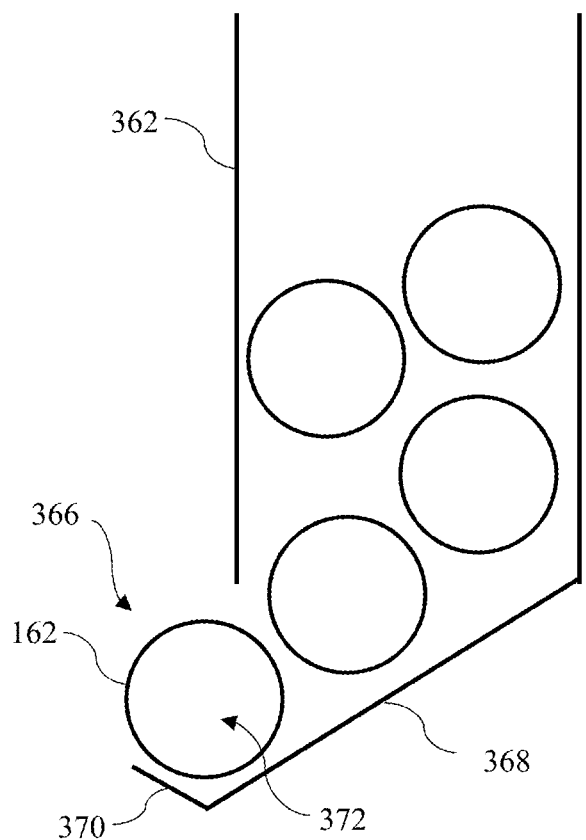
FIG. 19 is a cross sectional view of the tube magazine station as in FIG. 4.

Referring to FIGS. 4 and 19, a tube magazine station 360 can be configured to provide empty tubes to the doffing system 90 for delivery to a winder 300. The tube magazine station 360 can comprise a hopper 362 comprising a plurality of sub-compartments 364. The hopper can receive tubes in each of the sub-compartments and can gravity-feed the tubes to respective outlets 366. The outlets 366 can comprise an opening at sufficient height (vertical positioning) to allow a single tube 162 to fit therethrough. The bottom surfaces 368 of the hoppers can have a slope with respect to a horizontal plane to bias the tubes toward their respective outlets. One or more upwardly projecting lips 370 can be positioned in communication with the outlets 366 to catch the tubes as they exit the outlet(s). Optionally, a respective lip 370 can be positioned in communication with each respective outlet 366. In this way, the tube magazine station 360 can position a plurality of rolls in axial alignment for receipt onto an elongate arm of a doffing apparatus 100. Optionally, each lip 370 can define a respective channel or receptacle 372 configured to receive at least a portion of at least one tube. Optionally, the tube magazine station 360 can have one or more sensors that can detect when the sub-compartments are low or empty. The sensors can be, for example, optical sensors or pressure sensors.

The doffing apparatus can load one or both elongate arms with the plurality of tubes held in axial alignment on the tube magazine station. For example, the doffing apparatus 100 can axially align one of its elongate arms 104 with the plurality of aligned tubes, with the respective driver 120 of the elongate arm in a proximal (retracted) position. The laser detector 140 (FIG. 7) of the doffing apparatus 100 can detect alignment with the plurality of aligned tubes. The AGV can then move forward (i.e., in the longitudinal dimension of the elongate arm) to receive the plurality of tubes onto the elongate arm. The AGV 200 can move away from (e.g., transversely to) the longitudinal dimension of the elongate arm to remove the tubes on the elongate arm from the tube magazine station. Optionally, the upwardly projecting lips 370 can deflect or pivot in a downward direction to enable tube removal from the tube magazine station 360. As the doffing apparatus 100 removes the tubes, a subsequent set of tubes in respective sub-compartments 364 of the hopper 362 can fall to the outlet 366 to be caught by the upwardly projecting lips 370, thereby aligning another plurality of tubes for receipt onto another elongate arm of the same or a different doffing apparatus 100. According to some optional aspects, the doffing apparatus 100 can then repeat the process of aligning and receiving empty tubes onto its other elongate arm.

Referring to FIGS. 9-13 and 16, a navigation system 500 can coordinate movement and operation of the AGVs 200 and their respective doffing apparatuses 100 within an operating environment. An exemplary operating environment 400 can comprise a home area 340 that defines respective home positions 342 for the doffing systems 90, a plurality of winders 300, and one or more loaders 320. The doffing systems 90 can be used to take material packages from the winder and provide the material packages to the loader 320. In further embodiments, the operating environment 400 can comprise a tube magazine station 360. The doffing systems 90 can further deliver empty tubes from the tube magazine station 360 and to the winders 300. The navigation system 500 can comprise a navigation server 502 in communication with the winders 300, the doffing systems 90, and the loaders 320, and, optionally, the sensors at the tube magazine station 360. In exemplary aspects, it is contemplated that the winders and the loaders can comprise one or more processing units and/or one or more sensors that are communicatively coupled to the navigation server 502 to provide information concerning the operation and/or status of the winders and the loaders.

According to some methods of operation, the doffing system 90 can wait at a home position until the doffing system is needed. A winder 300 can wind one or more packages at a time. For example, according to some optional aspects, the winder can receive four empty tubes on its chuck and simultaneously wind four packages. The winder 300 can send a signal to the navigation server 502 indicating that the winder requires doffing. For example, when the winder produces a material package (or a plurality of material packages) having a sufficient diameter, the winder can relay such information to the navigation server 502. In further aspects, the navigation server 502 can predict when the winder will have produced the material packages having sufficient diameters (e.g., by using a material feed rate and a known completed package size) and cause the doffing system 90 to position itself at the winder prior to, at, or shortly after completion of the material packages. For example, via automated software, the navigation server 502 can send a wireless signal to a doffing system 90 to cause the doffing system to go to the winder 300. It is contemplated that the AGV 200 can comprise a guidance system that can position the AGV at the winder proximate to the winder, such as, for example, within 100 mm.

Optionally, in some aspects, the winder can comprise a plurality of chucks 302 (e.g., 2 chucks) that can be pivotable about a pivotal axis to selectively position one chuck in position to receive material and another chuck in position for doffing. In this way, the winder can wind material with one chuck while doffing complete packages and receiving empty tubes on the other chuck. In these aspects, once the winder has completed forming material packages, the winder can pivot the chucks about the pivotal axis to position the chuck with completed material packages in position to doff the completed packages. It is contemplated that the vertical position of the chuck, when in this pivotal position about the pivotal axis, can be a known height, and the riser of the AGV 200 can move vertically to enable coaxial alignment between the elongate arm 104 and the chuck.

The doffing system 90 can then fine tune its alignment with the winder chuck. For example, the camera 146 of the doffing system 90 can capture an image of the winder chuck (or other reference surface or marker) and determine, via software that is well-known in the art of AGV guidance, linear (e.g., x, y, and z positions) and angular positions (e.g., theta offsets) of the doffing system relative to the winder chuck. Using the linear and angular positions of the doffing system relative to the winder chuck, the doffing system can move to adjust its position to align one elongate arm 104 coaxially with, and at a select axial spacing from, the winder chuck. Optionally, the doffing system 90 can iteratively align itself. For example, the doffing system 90 can capture the image of the winder chuck (or other reference surface or marker), determine its position relative to the winder chuck, and move to improve its alignment relative to the winder chuck, and repeat. This can be repeated a plurality of times (e.g., six times). Although the use of such AGV guidance software is well-known in the art, the usage of these features in combination with the disclosed doffing apparatus provides significant advantages in the context of doffing and other filament extrusion processing steps as disclosed herein.

Once generally aligned (e.g., after a predetermined number of iterations or within select linear and angular tolerances), in some optional aspects, the doffing system 90 can move only horizontally transversely to the longitudinal dimension of the elongate arm 104 to align the arm with the winder chuck. Next, the doffing system 90 can move only parallel to the longitudinal dimension of the elongate arm 104) to decrease the axial spacing between the elongate arm and the winder chuck. The doffing system 90 can use continuous or iterative feedback from the laser scanner to position the elongate arm 104 at a select axial spacing from the chuck. The select axial spacing can optionally range from 40 mm to 55 mm (for example, 47.5 mm).

The doffing system 90 can then move horizontally transversely to the longitudinal dimension of the elongate arm 104 to achieve optimal alignment. For example, the doffing apparatus 100 can scan the recess 306 in the chuck 302 with its laser scanner to ensure alignment of one elongate arm 104 with the winder chuck. As the doffing system 90 moves horizontally transversely to the longitudinal dimension of the elongate arm 104, the laser scanner can measure a step decrease in its linear distance measurement corresponding to the depth of the recess 306, indicating that the laser has moved out of the recess. The doffing system 90 can then move in the opposite direction (horizontally transversely to the longitudinal dimension of the elongate arm 104) by the radius of the recess, thereby corresponding to the elongate arm being coaxially aligned with the chuck 302 of the winder 300.

The winder 300 can then doff the one or more packages (e.g., 4 packages) from its chuck 302 onto an elongate arm 104 of the doffing apparatus 100. For example, the chuck 302 (FIG. 8) can have a driver that can have a similar structure and operate in a similar manner to that of the driver 120 of the doffing apparatus 100. The driver of the chuck 302 can move distally to push the material package(s) onto one elongate arm 104 of the doffing apparatus. The winder can communicate with the navigation server 502 to provide an indication that the winder has provided the material packages to the doffing system.

The navigation server can then communicate with the doffing system to cause the doffing system to move to the loader 320. The doffing system 90 can use its alignment device to align itself with the gripper of the loader 320 when the loader is in a home position. The driver of the doffing apparatus can then push the material packages onto the loader 320, optionally, one material package at a time. The loader 320 can provide the material packages to a cart transport 600 (FIGS. 15A-15C). The loader 320 can return to a home position to receive more material packages from the doffing apparatus 100 until the doffing apparatus has unloaded all of its inventory.

Optionally, the doffing system 90 can deliver empty tubes to a winder. For example, in some embodiments, an operator can manually load empty tubes onto the doffing apparatus. In further embodiments, the doffing system 90 can collect tubes from the tube magazine station 360, as disclosed herein. In some embodiments, the doffing system 90 can receive one or more material packages 160 from the chuck of the winder 300 and then deliver one or more empty tubes to a winder 300. For example, the doffing apparatus can load a first arm with a plurality of empty tubes 162 and can have an empty second arm (with no tubes positioned on the second arm). The doffing apparatus can receive the one or more material packages 160 from the winder 300 on its empty second arm and subsequently replace the winder with one or more empty tubes 162 from its first arm.

Referring to FIGS. 15A-15C, the cart transport 600 can be an automatically guided vehicle. The cart transport 600 can comprise a chassis 602 that can defines a cargo area 604. A lift 606 can be situated within the cargo area. The lift 606 can be configured to move laterally and vertically to receive a cart 620. As shown in FIG. 15A, the cart transport 600 can horizontally align the cargo area 604 with the cart 620. As shown in FIG. 15B, the lift can extend horizontally to position itself beneath the cart 620. The lift 606 can then raise the cart 620 above a lower edge of the cargo area 604. The lift 606 can then horizontally retract to position the cart 620 within the cargo area 604, as shown in FIG. 15C.

The cart transport 600 can then move to deliver a cart 620 with material packages thereon to a location for further processing. The cart transport 600 can then place the cart 620 by performing the reverse of the steps for positioning the cart 620 within the cargo area 604. The cart transport 600 can then pick up an empty cart 620 and deliver the empty cart 620 to a location where it can be loaded by a loader 320.

Figure 17:
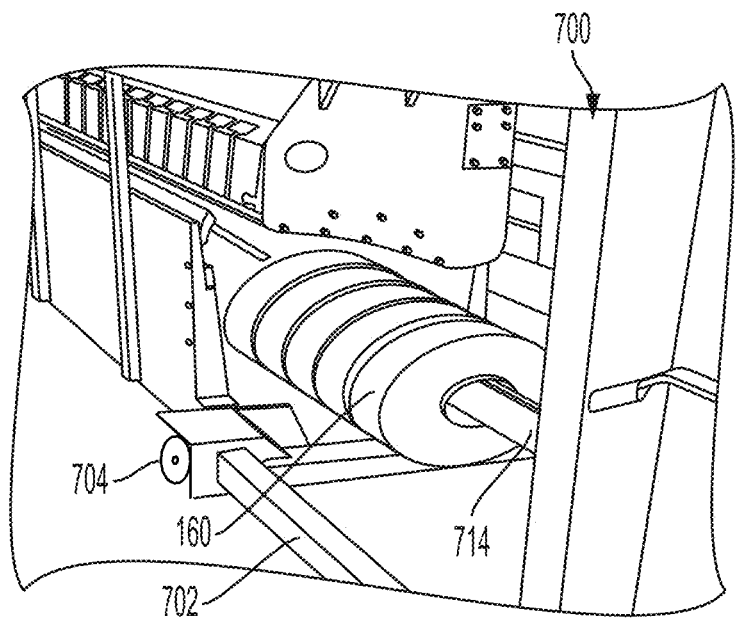
FIG. 17 is a rear perspective view of a manual doffing apparatus, in accordance with embodiments disclosed herein.
Figure 18:
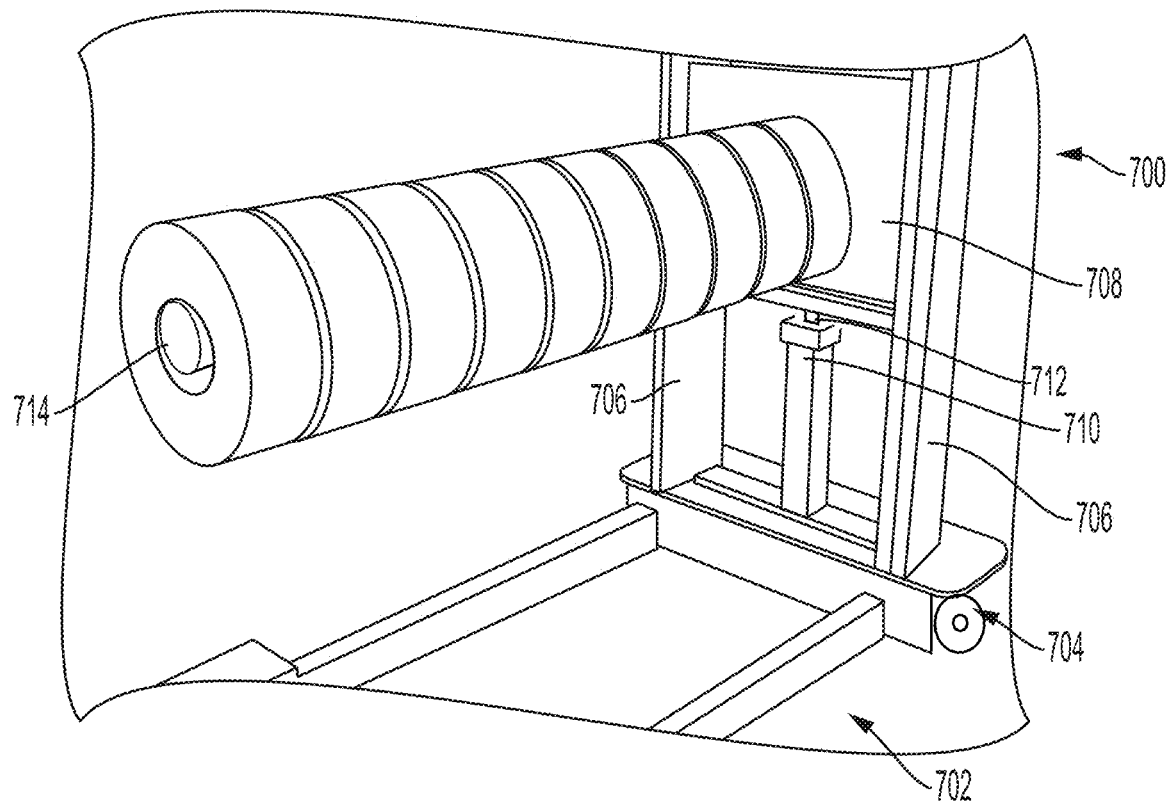
FIG. 18 is a front perspective view of the manual doffing apparatus as in FIG. 17.

Referring to FIGS. 17 and 18, in some optional aspects, a manual doffing apparatus 700 can be used to receive the packages from the winders 300 and transport the material packages to the loader 320. The manual doffing apparatus can comprise a base 702. A plurality of wheels 704 can support the base 702. One or more columns 706 (e.g., two, as shown) can extend vertically from the base 702. The columns 706 can support a plate 708. The plate 708 can be slidable between the columns 706. A cylinder 710 (e.g., a pneumatic cylinder or a hydraulic cylinder) can vertically position the plate 708 along the columns 706. For example, the cylinder can be positioned between the base 702 and the plate 708. The cylinder can attach to the base 702. A piston within the cylinder can drive a piston rod 712 that attaches to the plate 708. In this way, as the piston drives the piston rod 712 upward, the plate correspondingly moves upward. A rod 714 (e.g., a cylindrical rod) can extend horizontally from the plate 708 to receive the material packages from the winder.

An operator can manually position the manual doffing apparatus 700 at the winder. That is, the operator can roll the manual doffing apparatus 700 to the winder 300 and then adjust the position of the piston in order to select the height of the rod 714. The winder can doff the material packages onto the rod 714. The operator can then wheel the manual doffing apparatus 700 to the loader 320.

Computing Device

FIG. 14 shows a system 1000 including an exemplary configuration of a computing device 1001 that, in some embodiments, can be the navigation server 502.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as environment management data 1007 (i.e., data from signals received by the AGV, the processor of the doffing apparatus (as further described herein), the winders, the loader, and/or the tube magazine station) and/or program modules such as operating system 1005 and environment management software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and environment management software 1006 may be stored on the mass storage device 1004. One or more of the operating system 1005 and environment management software 1006

(or some combination thereof) may comprise program modules and the environment management software 1006. Environment management data 1007 may also be stored on the mass storage device 1004. Environment management data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001. In exemplary embodiments, the remote computing devices 1014a,b,c can be on-board computers or programmable logic controllers of the doffing apparatus 100, the AGVs 200, the winders 300, the loader 320, etc.

Application programs and other executable program components such as the operating system 1005 are shown herein as discrete blocks, although it is recognized that such programs and components may reside at various times in different storage components of the computing device 1001, and are executed by the one or more processors 1003 of the computing device 1001. An implementation of data processing software 1006 may be stored on or sent across some form of computer readable media. Any of the disclosed methods may be performed by processor-executable instructions embodied on computer readable media.

Although various computing devices are disclosed herein as being associated with certain functions, it is contemplated that such functions can be associated with any other suitable computing device within the operating environment. Thus, for example, although the PLC 92 is disclosed as controlling the driver 120, in further optional aspects, a separate computing device can be associated with the AGV, and the separate computing device can perform various functions disclosed herein as being associated with the PLC 92. Similarly, various aspects of alignment and navigation of the doffing system 90 can be performed by computing devices associated with the doffing system 90 (e.g., a PLC associated with the doffing apparatus or the separate computing device associated with the AGV) or the navigation server 502.

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A doffing apparatus that is configured to couple to an automatically guided vehicle (AGV), the doffing apparatus comprising: at least one elongate arm, each elongate arm of the at least one elongate arm having a proximal end, a distal end, and a length, wherein at least a portion of each elongate arm of the at least one elongate arm is configured to support at least one bobbin on the elongate arm; and at least one driver, each driver of the at least one driver being configured to move along a respective elongate arm, wherein when at least one bobbin is supported on the respective elongate arm, distal movement of the driver along the respective elongate arm is configured to move the at least one bobbin toward the distal end of the elongate arm.

Aspect 2: The doffing apparatus of aspect 1, further comprising at least one alignment device configured to provide an output indicative of a location of one or more elongate arms with respect to one or more target locations.

Aspect 3: The doffing apparatus of aspect 1 or aspect 2, wherein each driver comprises: a worm drive comprising a worm wheel and a worm, wherein the worm extends longitudinally along a corresponding elongate arm, and a collar that is slidable along the corresponding elongate arm, wherein the collar is coupled to the worm so that rotation of the worm causes translation of the collar.

Aspect 4: The doffing apparatus of any one of the preceding aspects, further comprising a chassis that is configured to be secured to an upper surface of the AGV.

Aspect 5: The doffing apparatus of claim 4, wherein the at least one elongate arm comprises first and second elongate arms positioned on opposing sides of the chassis, and wherein the at least one driver comprises first and second drivers, wherein the first driver is configured to move along the first elongate arm, and wherein the second driver is configured to move along the second elongate arm.

Aspect 6: A doffing system comprising: an AGV; a doffing apparatus as in any one of the preceding aspects; at least one alignment device configured to provide an output indicative of a location of one or more elongate arms with respect to one or more target locations; and at least one processor, wherein the at least one processor is configured to: receive feedback from the at least one alignment device, provide a control signal to cause the AGV to align a first elongate arm of the at least one elongate arm with a receptacle at a loader, and cause a first driver of the at least one driver to move a select distance along the length of the first elongate arm.

Aspect 7: The doffing system of aspect 6, wherein the at least one processor is physically associated with the AGV.

Aspect 8: The doffing system of aspect 6, wherein the at least one processor is physically associated with the doffing apparatus.

Aspect 9: The doffing system of any one of aspects 6-8, wherein the at least one alignment device comprises a laser range detector, wherein the laser range detector is configured to: emit a laser beam toward a surface of the one or more target locations; receive a reflection of the laser beam from the surface of the one or more target locations; and determine a distance from the laser range detector to the surface of the one or more target locations based on the received reflection of the laser beam.

Aspect 10: The doffing system of aspect 9, wherein the one or more target locations comprises a body defining a cylindrical recess.

Aspect 11: The doffing apparatus of any one of aspects 6-10, wherein the at least one alignment device comprises a camera that is configured to capture an image having a reference surface therein, wherein the processor is further configured to: receive the image, and determine, based on the image, a position of the doffing apparatus relative to the reference surface.

Aspect 12: A system comprising: a doffing system as in any one of aspects 6-11 at least one winder, each winder of the at least one winder having a chuck; and a computing device comprising at least one second processor and a memory in communication with the at least one second processor, wherein the memory has instructions thereon that, when executed by the at least one second processor of the computing device, cause the at least one second processor of the computing device to: cause the AGV to align one elongate arm of the at least one elongate arm of the doffing apparatus with the chuck of the at least one winder; and cause the chuck to doff a material package onto to the one elongate arm of the doffing apparatus.

Aspect 13: The system of aspect 12, further comprising a loader having a robotic arm with an end effector, wherein, the memory has instructions that, when executed by the at least one second processor, cause the at least one second processor to: cause the AGV to move toward the loader, cause the AGV to align the doffing apparatus with the end effector of the robotic arm, and cause the driver to doff the material package to the end effector of the robotic arm.

Aspect 14: The system of aspect 12 or aspect 13, further comprising a tube magazine station, the tube magazine station comprising: a hopper having at least one compartment, wherein the hopper defines a respective inlet opening and a respective outlet in communication with each compartment of the at least one compartment, wherein each inlet opening is configured to receive at least one empty bobbin, wherein each outlet is sized to allow one respective empty bobbin at a time to pass therethrough, wherein each compartment of the at least one compartment has a lower surface with a slope that is configured to bias the at least one empty bobbin toward the outlet in communication with the compartment; and at least one lip, wherein the at least one lip is configured to retain the respective one empty bobbin as the respective one empty bobbin exits each outlet.

Aspect 15: The system of aspect 14, wherein the at least one compartment comprises a plurality of compartments, wherein the at least one outlet comprises a plurality of outlets, wherein the at least one lip comprises a plurality of lips, wherein a respective lip is associated with each outlet and is configured to retain the respective empty bobbin in axial alignment with each other empty bobbin retained by the respective lip associated with each other outlet.

Aspect 16: The system of aspect 14 or aspect 15, wherein the memory has instructions that, when executed by the at least one second processor, cause the at least one second processor to: cause the AGV to align one elongate arm of the at least one elongate arm of the doffing apparatus with each empty bobbin retained by the at least one lip of the tube magazine station; and cause the AGV to move to receive each empty bobbin retained at each outlet of the plurality of compartments on the one elongate arm.

Aspect 17: The system of aspect 16, wherein, the memory has instructions that, when executed by the at least one second processor, cause the at least one second processor to: cause the AGV to move to a winder of the at least one winder; cause the AGV to align the one elongate arm of the at least one elongate arm of the doffing apparatus with the chuck of the winder; and cause the doffing apparatus to doff each empty bobbin received on the one elongate arm onto the chuck of the winder.

Although the foregoing invention has been described in some detail by way of illustration and example for purposes of clarity of understanding, certain changes and modifications may be practiced within the scope of the appended claims.

What is claimed is:

1. A system comprising:
    an AGV;
    a doffing apparatus that is coupled to the AGV, wherein the doffing apparatus comprises:
        at least one elongate arm, each elongate arm having a proximal end, a distal end, and a length, wherein at least a portion of each elongate arm of the at least one elongate arm is configured to support at least one bobbin on the elongate arm; and
        at least one driver, each driver being configured to move along a respective elongate arm to move a bobbin toward the distal end of the elongate arm, wherein when at least one bobbin is supported on the respective elongate arm, distal movement of the driver along the respective elongate arm is configured to move the at least one bobbin toward the distal end of the elongate arm;
    at least one alignment device configured to provide an output indicative of a location of one or more elongate arms with respect to one or more target locations; and
    at least one processor, wherein the at least one processor is configured to:
        receive feedback from the at least one alignment device,
        provide a control signal to cause the AGV to align a first elongate arm of the at least one elongate arm with a receptacle at a loader, and
        cause a first driver of the at least one driver to move a select distance along the length of the first elongate arm;

at least one winder, each winder of the at least one winder having a chuck;
a loader having a robotic arm with an end effector; and
a computing device comprising at least one second processor and a memory in communication with the at least one second processor, wherein the memory has instructions thereon that, when executed by the at least one second processor of the computing device, cause the at least one second processor of the computing device to:
cause the AGV to align one elongate arm of the at least one elongate arm of the doffing apparatus with the chuck of the at least one winder;
cause the chuck to doff a material package onto to the one elongate arm of the doffing apparatus;
cause the AGV to move toward the loader;
cause the AGV to align the doffing apparatus with the end effector of the robotic arm; and
cause the driver to doff the material package to the end effector of the robotic arm.

2. The system of claim 1, wherein each driver of the doffing apparatus comprises:
a worm drive comprising a worm wheel and a worm, wherein the worm extends longitudinally along a corresponding elongate arm, and
a collar that is slidable along the corresponding elongate arm, wherein the collar is coupled to the worm so that rotation of the worm causes translation of the collar.

3. The system of claim 1, wherein the doffing apparatus further comprises a chassis that is configured to be secured to an upper surface of the AGV.

4. The system of claim 3, wherein the at least one elongate arm of the doffing apparatus comprises first and second elongate arms positioned on opposing sides of the chassis, and wherein the at least one driver comprises first and second drivers, wherein the first driver is configured to move along the first elongate arm, and wherein the second driver is configured to move along the second elongate arm.

5. A doffing system comprising:
an AGV;
a doffing apparatus that is coupled to the AGV, wherein the doffing apparatus comprises:
at least one elongate arm, each elongate arm having a proximal end, a distal end, and a length, wherein at least a portion of each elongate arm of the at least one elongate arm is configured to support at least one bobbin on the elongate arm; and
at least one driver, each driver being configured to move along a respective elongate arm to move a bobbin toward the distal end of the elongate arm, wherein when at least one bobbin is supported on the respective elongate arm, distal movement of the driver along the respective elongate arm is configured to move the at least one bobbin toward the distal end of the elongate arm;
at least one alignment device configured to provide an output indicative of a location of one or more elongate arms with respect to one or more target locations; and
at least one processor, wherein the at least one processor is configured to:
receive feedback from the at least one alignment device,
provide a control signal to cause the AGV to align a first elongate arm of the at least one elongate arm with a receptacle at a loader, and
cause a first driver of the at least one driver to move a select distance along the length of the first elongate arm,
wherein the doffing system is in communication with a computing device comprising at least one second processor and a memory in communication with the at least one second processor, wherein the computing device is in communication with:
at least one winder, each winder of the at least one winder having a chuck; and
a loader having a robotic arm with an end effector,
wherein the memory has instructions thereon that, when executed by the at least one second processor of the computing device, cause the at least one second processor of the computing device to:
cause the AGV to align one elongate arm of the at least one elongate arm of the doffing apparatus with the chuck of the at least one winder;
cause the chuck to doff a material package onto said one elongate arm of the doffing apparatus;
cause the AGV to move toward the loader;
cause the AGV to align the doffing apparatus with the end effector of the robotic arm; and
cause the driver to doff the material package to the end effector of the robotic arm.

6. The doffing system of claim 5, wherein the at least one processor is physically associated with the AGV.

7. The doffing system of claim 5, wherein the at least one processor is physically associated with the doffing apparatus.

8. The doffing system of claim 5, wherein the at least one alignment device comprises a laser range detector, wherein the laser range detector is configured to:
emit a laser beam toward a surface of the one or more target locations;
receive a reflection of the laser beam from the surface of the one or more target locations; and
determine a distance from the laser range detector to the surface of the one or more target locations based on the received reflection of the laser beam.

9. The doffing system of claim 8, wherein the one or more target locations comprises a body defining a cylindrical recess.

10. The doffing apparatus of claim 5, wherein the at least one alignment device comprises a camera that is configured to capture an image having a reference surface therein, wherein the processor is further configured to:
receive the image, and
determine, based on the image, a position of the doffing apparatus relative to the reference surface.

11. The doffing system of claim 5, wherein each driver of the doffing apparatus comprises:
a worm drive comprising a worm wheel and a worm, wherein the worm extends longitudinally along a corresponding elongate arm, and
a collar that is slidable along the corresponding elongate arm, wherein the collar is coupled to the worm so that rotation of the worm causes translation of the collar.

12. The doffing system of claim 5, wherein the doffing apparatus comprising a chassis that is coupled to an upper surface of the AGV.

13. The doffing system of claim 12, wherein the at least one elongate arm comprises first and second elongate arms positioned on opposing sides of the chassis, and wherein the at least one driver comprises first and second drivers, wherein the first driver is configured to move along the first elongate arm, and wherein the second driver is configured to move along the second elongate arm.

14. The system of claim 1, further comprising a tube magazine station, the tube magazine station comprising:
  a hopper having at least one compartment, wherein the hopper defines a respective inlet opening and a respective outlet in communication with each compartment of the at least one compartment, wherein each inlet opening is configured to receive at least one empty bobbin, wherein each outlet is sized to allow one respective empty bobbin at a time to pass therethrough, wherein each compartment of the at least one compartment has a lower surface with a slope that is configured to bias the at least one empty bobbin toward the outlet in communication with the compartment; and
  at least one lip, wherein the at least one lip is configured to retain the respective one empty bobbin as the respective one empty bobbin exits each outlet.

15. The system of claim 14, wherein the at least one compartment comprises a plurality of compartments, wherein the at least one outlet comprises a plurality of outlets, wherein the at least one lip comprises a plurality of lips, wherein a respective lip of the plurality of lips is associated with each outlet and is configured to retain the respective empty bobbin in axial alignment with each other empty bobbin retained by the respective lip associated with each other outlet.

16. The system of claim 15, wherein the memory has instructions that, when executed by the at least one second processor, cause the at least one second processor to:
  cause the AGV to align one elongate arm of the at least one elongate arm of the doffing apparatus with each empty bobbin retained by the at least one lip of the tube magazine station; and
  cause the AGV to move to receive each empty bobbin retained at each outlet of the plurality of compartments on the one elongate arm.

17. The system of claim 16, wherein, the memory has instructions that, when executed by the at least one second processor, cause the at least one second processor to:
  cause the AGV to move to a winder of the at least one winder;
  cause the AGV to align the one elongate arm of the at least one elongate arm of the doffing apparatus with the chuck of the winder; and
  cause the doffing apparatus to doff each empty bobbin received on the one elongate arm onto the chuck of the winder.

18. A system comprising:
  an AGV;
  a doffing apparatus that is coupled to the AGV, wherein the doffing apparatus comprises:
    at least one elongate arm, each elongate arm having a proximal end, a distal end, and a length, wherein at least a portion of each elongate arm of the at least one elongate arm is configured to support at least one bobbin on the elongate arm; and
    at least one driver, each driver being configured to move the at least one bobbin toward the distal end of the elongate arm;
  at least one winder, each winder of the at least one winder having a chuck;
  a loader having a robotic arm with an end effector; and
  a computing device comprising at least one second processor and a memory in communication with the at least one second processor, wherein the memory has instructions thereon that, when executed by the at least one second processor of the computing device, cause the at least one second processor of the computing device to:
    cause the AGV to align one elongate arm of the at least one elongate arm of the doffing apparatus with the chuck of the at least one winder;
    cause the chuck to doff a material package onto to the one elongate arm of the doffing apparatus;
    cause the AGV to move toward the loader;
    cause the AGV to align the doffing apparatus with the end effector of the robotic arm; and
    cause the driver to doff the material package to the end effector of the robotic arm.

* * * * *